US009697067B2

(12) United States Patent
Nakajima

(10) Patent No.: US 9,697,067 B2
(45) Date of Patent: Jul. 4, 2017

(54) MONITORING SYSTEM AND MONITORING METHOD

(71) Applicant: HITACHI, LTD., Tokyo (JP)

(72) Inventor: Masaki Nakajima, Tokyo (JP)

(73) Assignee: HITACHI, LTD., Tokyo (JP)

( * ) Notice: Subject to any disclaimer, the term of this patent is extended or adjusted under 35 U.S.C. 154(b) by 139 days.

(21) Appl. No.: 14/762,924

(22) PCT Filed: Nov. 8, 2013

(86) PCT No.: PCT/JP2013/080289
§ 371 (c)(1),
(2) Date: Jul. 23, 2015

(87) PCT Pub. No.: WO2015/068275
PCT Pub. Date: May 14, 2015

(65) Prior Publication Data
US 2015/0370625 A1 Dec. 24, 2015

(51) Int. Cl.
G06F 11/00 (2006.01)
G06F 11/07 (2006.01)
G06F 11/32 (2006.01)
G06F 11/30 (2006.01)

(52) U.S. Cl.
CPC ...... *G06F 11/0772* (2013.01); *G06F 11/0709* (2013.01); *G06F 11/0751* (2013.01); *G06F 11/0766* (2013.01); *G06F 11/328* (2013.01); *G06F 11/079* (2013.01); *G06F 11/3006* (2013.01); *G06F 11/3055* (2013.01); *G06F 2201/86* (2013.01)

(58) Field of Classification Search
CPC ............ G06F 11/0772; G06F 11/0766; G06F 11/328; G06F 11/327; G06F 11/321
See application file for complete search history.

(56) References Cited

U.S. PATENT DOCUMENTS

| 8,201,028 B2* | 6/2012 | Sawczak | G06F 1/206 714/47.1 |
| 2003/0101261 A1 | 5/2003 | Ikeda et al. | |
| 2008/0126858 A1* | 5/2008 | Barras | G06F 11/327 714/25 |
| 2011/0138236 A1* | 6/2011 | Park | G06F 11/0715 714/57 |
| 2011/0154117 A1* | 6/2011 | Danielson | G06F 11/0748 714/37 |

(Continued)

FOREIGN PATENT DOCUMENTS

| JP | 07-143123 A | 6/1995 |
| JP | 11-306108 A | 11/1999 |

(Continued)

*Primary Examiner* — Philip Guyton
(74) *Attorney, Agent, or Firm* — Volpe and Koenig, P.C.

(57) ABSTRACT

A monitoring system includes positional information for indicating positions to display failures which occur in the computers on a screen image, event information for indicating failures which occur in the computers, times at which the failures have occurred, and statuses of troubleshooting of the failures, an image creation part for creating a screen image indicating failures which occurred by the end time and have not been removed at a current time based on the positional information and the event information, and a display part for displaying the created screen image.

15 Claims, 17 Drawing Sheets

(56) References Cited

U.S. PATENT DOCUMENTS

| | | | |
|---|---|---|---|
| 2012/0204068 A1* | 8/2012 | Ye | G06F 11/0709 |
| | | | 714/57 |
| 2014/0146648 A1* | 5/2014 | Alber | G11B 27/002 |
| | | | 369/53.1 |
| 2015/0180739 A1* | 6/2015 | Horn | G06F 8/65 |
| | | | 709/224 |
| 2015/0229546 A1* | 8/2015 | Somaiya | H04L 43/045 |
| | | | 715/736 |

FOREIGN PATENT DOCUMENTS

| | | |
|---|---|---|
| JP | 2003-050622 A | 2/2003 |
| JP | 2003-162504 A | 6/2003 |
| JP | 2004-078369 A | 3/2004 |

\* cited by examiner

| EVENT ID (161) | OCCURRENCE DATE AND TIME (162) | HOST NAME (163) | STATUS OF TROUBLESHOOTING (164) | TROUBLESHOOTING TIME (min) (165) |
|---|---|---|---|---|
| 00000001 | 2013/03/01 12:00 | HostA | UNFINISHED | — |
| 00000004 | 2013/03/01 18:00 | HostA | FINISHED | 40 |
| 00000002 | 2009/03/01 17:00 | HostA | FINISHED | 20 |
| ⋮ | ⋮ | ⋮ | ⋮ | ⋮ |

EVENT INFORMATION (106)

FIG. 4

| HOST NAME (181) | COORDINATES (182) | UPDATE DATE AND TIME (183) |
|---|---|---|
| HostA | x=4,y=5 | 2013/04/03 10:00 |
| HostA | x=4,y=6 | 2013/04/25 13:00 |
| HostB | x=1,y=2 | 2013/04/05 14:00 |
| HostC | x=3,y=2 | 2013/04/05 17:00 |
| ⋮ | ⋮ | ⋮ |

DISPLAY INFORMATION (108)

FIG. 5

| 191 | 192 | 193 | 109 |
|---|---|---|---|
| INDICATION TIME | INDICATION INFORMATION | PAUSE TIME (sec) | |
| 2013/07/01 05:30:00 | HostA(4,6) = WITH WARNING COLOR, HostB(1,2) = WITHOUT WARNING COLOR, HostC(3,2) = WITHOUT WARNING COLOR, ⋯ | 1 | |
| 2013/07/01 05:30:01 | HostA(4,6) = WITH WARNING COLOR, HostB(1,2) = WITH WARNING COLOR, HostC(3,2) = WITHOUT WARNING COLOR, ⋯ | 0 | |
| 2013/07/01 05:30:02 | HostA(4,6) = WITH WARNING COLOR, HostB(1,2) = WITHOUT WARNING COLOR, HostC(3,2) = WITHOUT WARNING COLOR, ⋯ | 0 | |
| 2013/07/01 05:30:03 | HostA(4,6) = WITHOUT WARNING COLOR, HostB(1,2) = WITH WARNING COLOR, HostC(3,2) = WITH WARNING COLOR, ⋯ | 4 | |
| ⋮ | ⋮ | ⋮ | |

SCREEN IMAGE INFORMATION

*FIG. 6*

| 111 | 112 | 113 | 110 |
|---|---|---|---|
| EVENT ID | HOST NAME | PAUSE TIME (sec) | |
| 00000001 | HostA | 1 | |
| 00000004 | HostD | 2 | |
| 00000002 | HostC | 4 | |
| ⋮ | ⋮ | ⋮ | |

EVENT MAPPING INFORMATION

*FIG. 7*

SCREEN IMAGE CREATION SUBPROGRAM

| EVENT ID | AVERAGE TROUBLESHOOTING TIME (min) | SEVERITY | LATEST TROUBLESHOOTING DATE AND TIME |
|---|---|---|---|
| 00000001 | 30 | URGENT(5) | 2013/03/01 12:00 |
| 00000002 | 90 | ERROR(2) | 2010/12/01 12:00 |
| 00000003 | 60 | ALERT(1) | 2009/05/01 12:00 |
| ⋮ | ⋮ | ⋮ | ⋮ |

FAILURE LEVEL RULE INFORMATION

TROUBLESHOOTING TIME-BASED LEVELS

LATEST TROUBLESHOOTING DATE-BASED LEVELS

MONITORING SYSTEM AND MONITORING METHOD

BACKGROUND

This invention relates to a monitoring system.

Systems for supporting businesses of companies growing in scale and complexity increase the needs for operation management systems to support stable operation of a system by managing operation information and performance information of the system. Many of the operation management products provide an event console for displaying a chronological list of events so that the user can grasp the occurrence times and the sequence of the events.

In the meanwhile, many of the operation management products display a map indicating locations of monitoring target apparatuses in the system on a monitoring screen and show a warning color when a failure occurs in a monitoring target apparatus to let the user detect the failure efficiently.

There is a proposed technique that, when a failure occurs in any one of the sites spread on a network or any one of the apparatuses installed therein, collects information related to the failure and changes the color of the corresponding graphic appearing on the monitor screen (for example, refer to Patent Literature 1). The technique in Patent Literature 1 further allows the user to selectively designate the types of minor errors of which the user does not need to be warned and flexibly determine whether or not to issue a warning depending on the type of error and system configuration.

Patent Literature 1: JP 2004-078369 A

SUMMARY

In a large-scale system employing the technique of JP 2004-078369 A, when too many failure events occur in the system to be addressed in time, the monitor screen consistently shows a warning color representing failures in the monitoring target apparatuses. As a result, the user can grasp the locations of the failed monitoring target apparatuses through the monitor screen; however, the user cannot accurately grasp the occurrence times and the sequence of the failure events, the number of failure events, or the situation of failures such as urgency to address the failure events.

In the case of monitoring with an existing event console that lists up failure events on the screen, the user can grasp the occurrence times and the sequence of the events, but cannot visually grasp the locations of the monitoring target apparatuses.

An object of this invention is to provide a monitoring system that properly indicates information on locations of the monitoring target apparatuses and the situation of failures.

A representative embodiment of this invention is a monitoring system including a network interface for connecting with computers, an input interface for receiving an end time of a designated period, positional information for indicating positions to display failures which occur in the computers on a screen image, event information for indicating failures which occur in the computers, times at which the failures have occurred, and statuses of troubleshooting of the failures, a screen image creation part for creating a screen image indicating failures which occurred by the end time and have not been removed at a current time based on the positional information and the event information, and a display part for displaying the created screen image.

An embodiment of this invention accomplishes proper indication of information on locations of monitoring target apparatuses and a situation of failures.

Problems, configurations, and effects other than those described above are clarified by the following detailed description of embodiments.

BRIEF DESCRIPTION OF THE DRAWINGS

FIG. 4 is an explanatory diagram illustrating event information in Embodiment 1;

FIG. 5 is an explanatory diagram illustrating display information for displaying monitoring target apparatuses in Embodiment 1;

FIG. 6 is an explanatory diagram illustrating screen image information in Embodiment 1;

FIG. 7 is an explanatory diagram illustrating event mapping information in Embodiment 1;

DETAILED DESCRIPTION OF THE EMBODIMENTS

Hereinafter, embodiments of this invention are described in detail with reference to the drawings.

Embodiment 1

A computer system in Embodiment 1 displays failures that occurred in a period designated by the user (hereinafter, referred to as designated period) on a monitoring screen. Furthermore, the computer system in Embodiment 1 successively displays situations of failures that occurred in monitoring target apparatuses by the end of the designated period (Time 2) in chronological order in the designated period.

Hereinafter, specific details are described using drawings.

Figure 1:
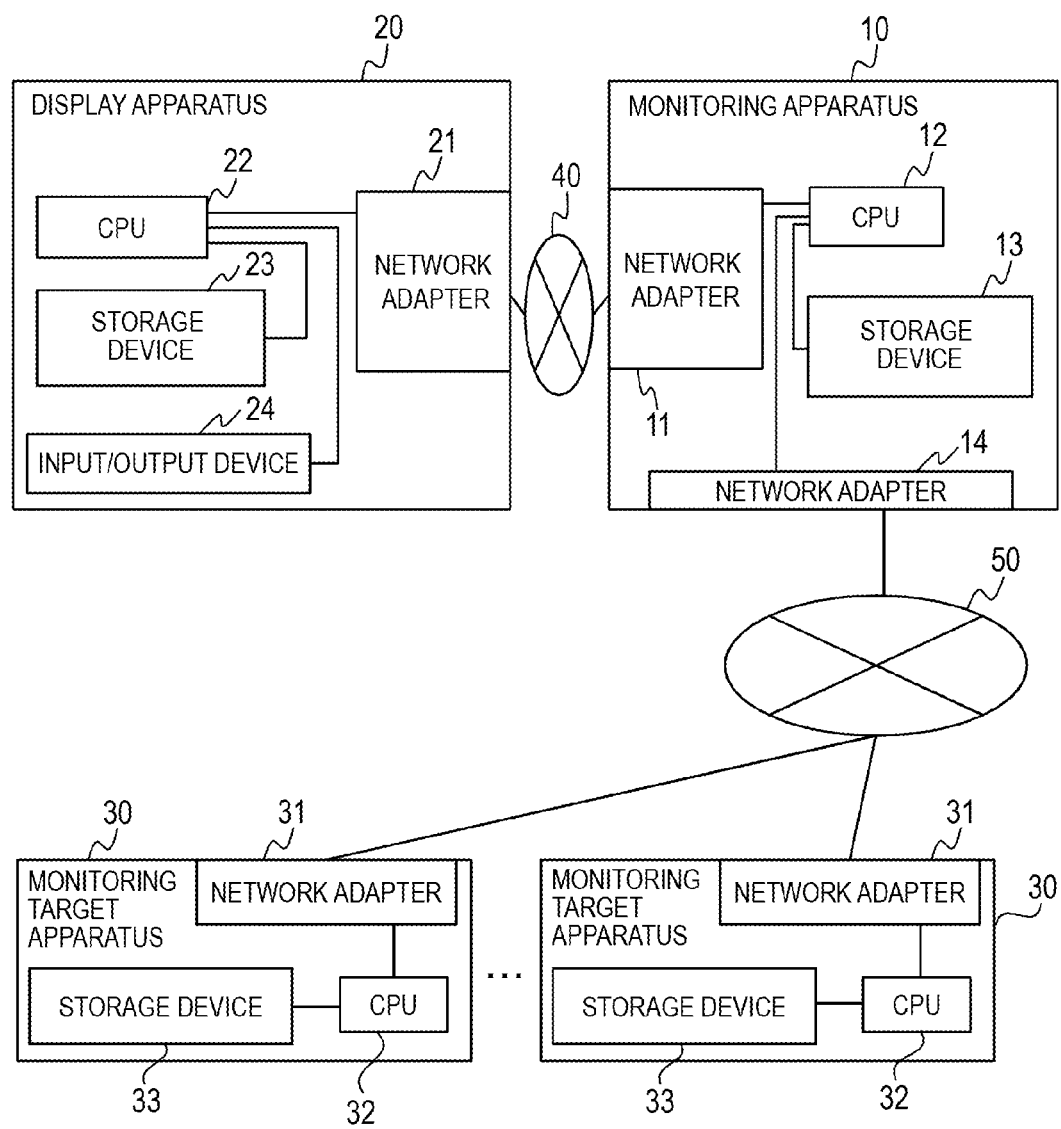
FIG. 1 is a block diagram illustrating a configuration of a computer system in Embodiment 1.

FIG. 1 is a block diagram illustrating a configuration of the computer system in Embodiment 1.

The computer system in this embodiment includes a monitoring apparatus 10, a display apparatus 20, at least one monitoring target apparatus 30, a network 40, and a network 50. The monitoring apparatus 10 is connected with the monitoring target apparatuses 30 via the network 50 and collects failure events that occur in the monitoring target apparatuses 30.

The display apparatus 20 is connected with the monitoring apparatus 10 via the network 40 and displays situations of failures detected by the monitoring apparatus 10 (particularly in Embodiment 1, information indicating occurrence of failures). The display apparatus 20 in Embodiment 1 displays screen images with which the user can visually note the physical locations or roles of the monitoring target apparatuses 30.

The monitoring apparatus 10 includes a network adapter 11, a CPU 12, a storage device 13, and a network adapter 14. The network adapter 11 is a network interface to communicate with the network 40; the network adapter 14 is a network interface to communicate with the network 50.

The CPU 12 is an arithmetic device. The storage device 13 includes a memory. The storage device 13 also includes an auxiliary storage device such as a hard disk as necessary. The CPU 12 executes programs using the storage device 13.

The monitoring apparatus 10 may include an input/output device. The input/output device included in the monitoring apparatus 10 may be a display device, a keyboard, a pointer device, and the like. The monitoring apparatus 10 may include a serial interface or an Ethernet interface as an interface to connect with the input/output device.

Such an interface of the monitoring apparatus 10 may be connected with a display computer including a display device and keyboard or a pointer device. The monitoring apparatus 10 may receive instructions from the user through the interface and the display computer or make the display computer display an outcome for the user.

The display apparatus 20 includes a network adapter 21, a CPU 22, a storage device 23, and an input/output device 24. The network adapter 21 is a network interface for connecting with the network 40.

The CPU 22 is an arithmetic device. The storage device 23 includes a memory. The storage device 23 also includes an auxiliary storage device such as a hard disk as necessary. The CPU 22 executes programs using the storage device 23.

The input/output device 24 includes an input device for receiving instructions from the user and an output device for displaying situations of failures to the user. The input/output device 24 may be a keyboard, a pointer device, a display device, and the like.

The monitoring target apparatuses 30 may be load balancing apparatuses, web servers, AP servers, and DB servers. Each monitoring target apparatus 30 includes a network adapter 31, a CPU 32, and a storage device 33. The network adapter 31 is a network interface for connecting with the network 50.

The CPU 32 is an arithmetic device. The storage device 33 includes a memory. The storage device 33 also includes an auxiliary storage device such as a hard disk as necessary. The CPU 32 executes programs using the storage device 33.

Hereinafter, an aggregation of one or more computers for monitoring the monitoring target apparatuses 30 and displaying screen images in this embodiment is called a monitoring system. In the case where the monitoring apparatus 10 displays screen images on its own input/output device, the monitoring apparatus 10 is the monitoring system. The pair of the monitoring apparatus 10 and the display computer 20 is also the monitoring system. For higher speed or higher reliability in monitoring processing, multiple computers may implement the monitoring apparatus 10; in this case, these multiple computers (including the display apparatus 20 if the display apparatus 20 displays screen images of this embodiment) are the monitoring system.

Figure 2:
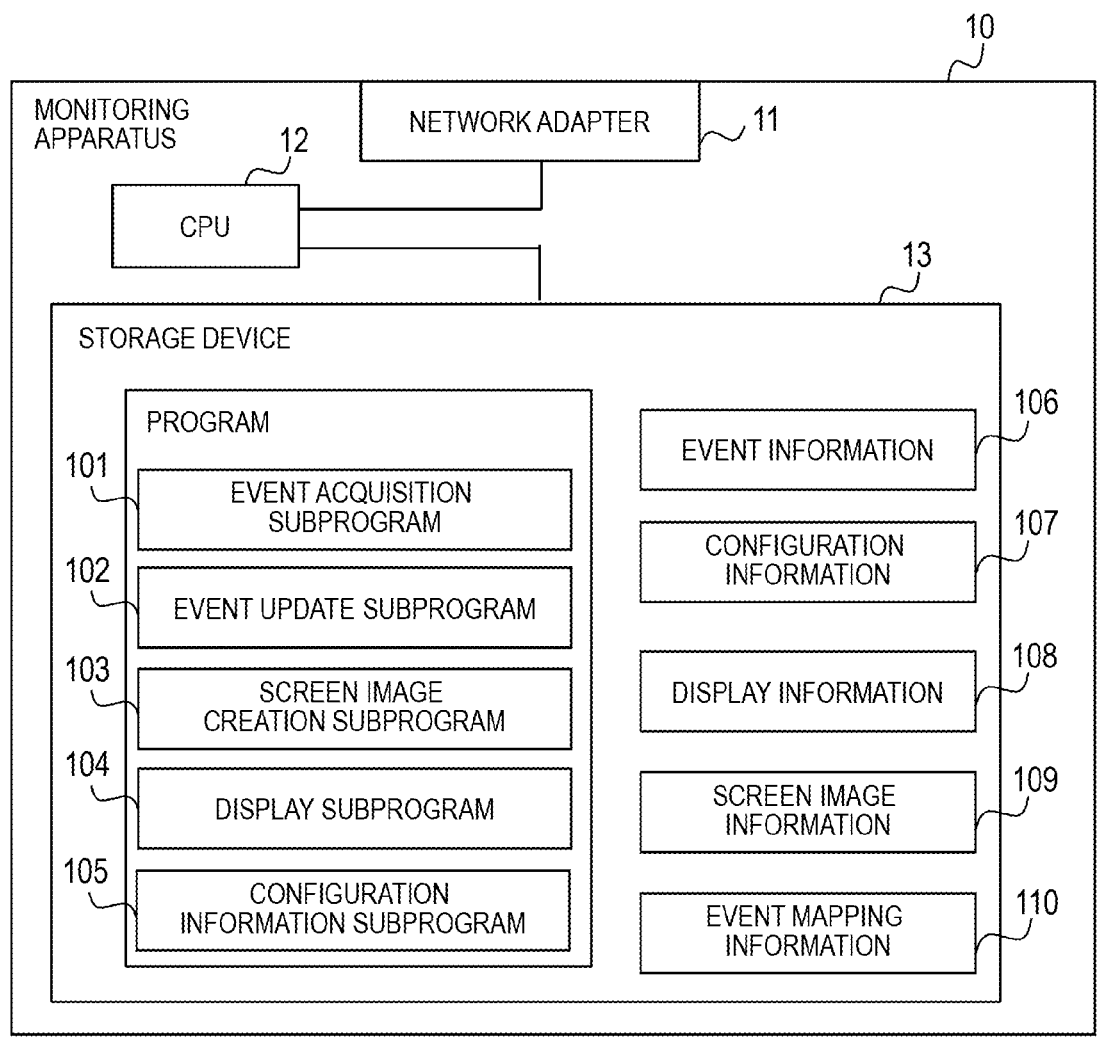
FIG. 2 is a block diagram illustrating a configuration of a monitoring apparatus in Embodiment 1.

FIG. 2 is a block diagram illustrating a configuration of the monitoring apparatus 10 in Embodiment 1.

The storage device 13 of the monitoring apparatus 10 includes a program including an event acquisition subprogram 101, an event update subprogram 102, a screen image creation subprogram 103, a display subprogram 104, and a configuration information subprogram 105. The storage device 13 also includes data including event information 106, configuration information 107, display information 108, screen image information 109, and event mapping information 110.

The event acquisition subprogram 101 detects failure events occurring in the monitoring target apparatuses 30 and collects information on the failure events through the network adapter 14. The event acquisition subprogram 101 then stores collected failure events in the event information 106.

The event update subprogram 102 stores information indicating that troubleshooting of a failure event has been finished in the event information 106 when the user has finished troubleshooting of the failure event.

The screen image creation subprogram 103 creates screen images for indicating failure events to the user. The display subprogram 104 displays the screen images created by the screen image creation subprogram 103 on the input/output device 24 of the display apparatus 20.

The configuration information 107 holds at least the host names and IP addresses of the monitoring target apparatuses 30. The configuration information subprogram 105 acquires the host names and IP addresses from the configuration information 107 at least to convert an IP address included in a detected failure event to a host name. The program held in the storage device 13 can convert the host name of a monitoring target apparatus 30 into the IP address and vice versa, using the configuration information subprogram 105.

The event information 106 holds failure events representing failures which occur in the monitoring target apparatuses 30. The event acquisition subprogram 101 uses the configuration information 107 to collect failure events representing occurring failures from the monitoring target apparatuses 30.

The display information 108 holds information required to create a screen image to display failures. The screen image information 109 holds information to be indicated on the screen. The event mapping information 110 indicates a pause time for each screen image determined in accordance with failure events and monitoring target apparatuses 30.

Figure 3:
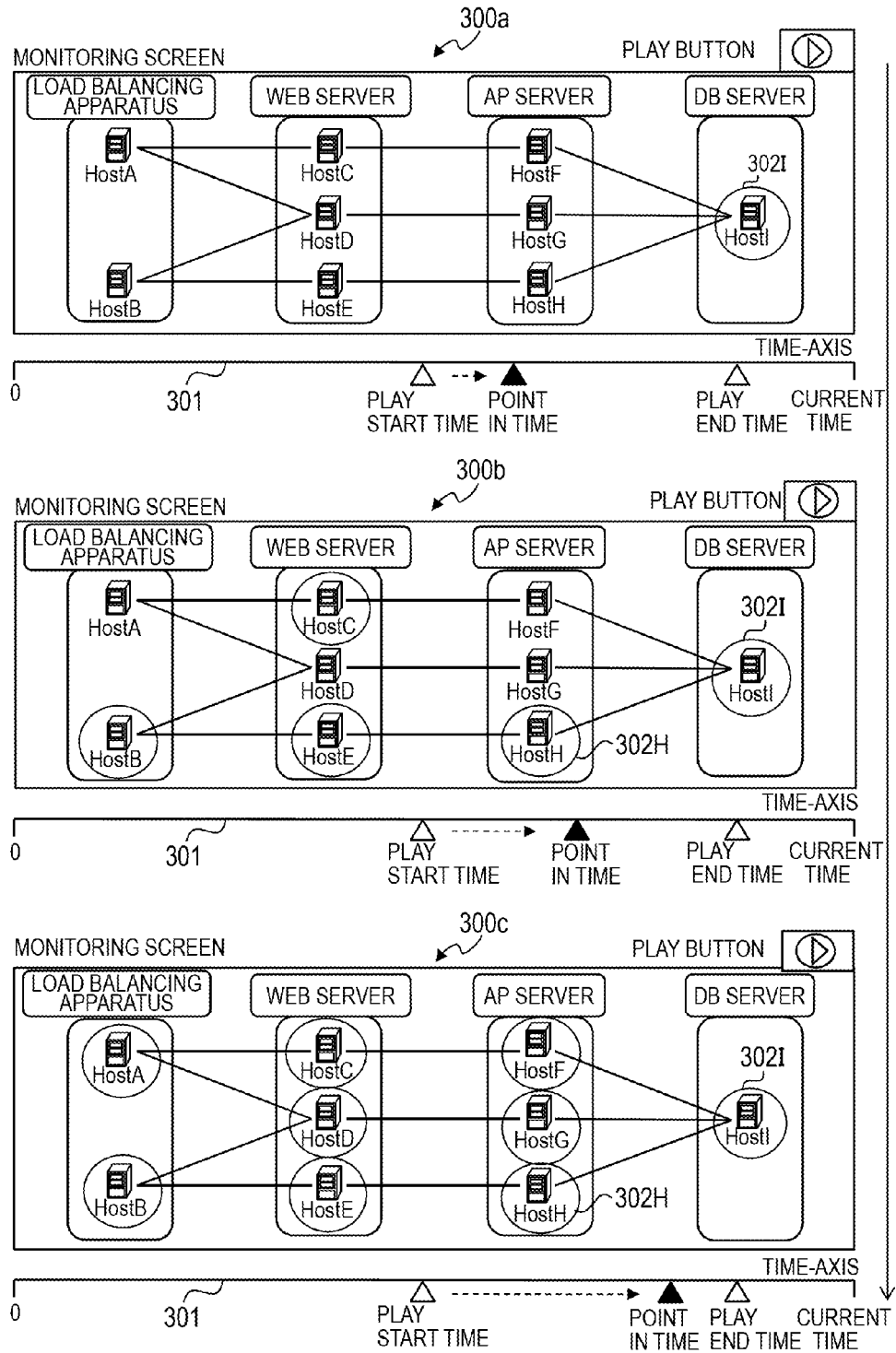
FIG. 3 is an explanatory diagram illustrating screen images each indicating a situation of failures at a given time in a designated period in Embodiment 1.

FIG. 3 is an explanatory diagram illustrating screen images 300 each indicating a situation of failures at a given time in a designated period in Embodiment 1.

The screen images 300a to 300c each indicate a situation of failures occurring in load balancing apparatuses, web servers, AP servers, and a DB server. The screen image in this embodiment may indicate a situation of failures occurring in any types of monitoring target apparatuses 30 other than these apparatuses.

The display subprogram 104 may change the layout of the screen images 300a to 300c and the positions to show the monitoring target apparatuses 30 in accordance with instructions from the user.

Furthermore, the screen images 300a to 300c each show a scroll bar 301 to input a time related to the situation of failures to appear. The scroll bar 301 represents a time axis. The user operates the scroll bar 301 to input information related to the situation of failures to see to the monitoring apparatus 10.

Specifically, the user specifies a play start time (Time 1) and a play end time (Time 2) on the scroll bar 301 and presses the play button to request to play an animation for the user to check the situation of failures. The display subprogram 104 successively and sequentially displays the screen images 300a, 300b, and 300c in accordance with the request.

Specifying Time 1 and Time 2 on the scroll bar 301 enables the monitoring screen to display the situation of failures and the status of troubleshooting in a discretional period inclusive of a momentary period.

The screen images 300a to 300c each indicate a situation of failures at a given time (point in time: Time 3) between Time 1 and Time 2. When a failure event occurs, the screen images 300a to 300c in FIG. 3 each show a warning color in a certain range around the icon representing the monitoring target apparatus 30 as information indicating that a failure event has occurred. The information indicating that a failure event has occurred may be shown by any appearance, such as figures including a circle, letters, symbols, patterns, and colors, as far as the information can capture the user's attention.

The screen images 300a to 300c each indicate information on failures that occurred in the monitoring target apparatuses 30 by Time 3 and have not been removed at the current time (as denoted by the reference signs 302H and 302I, for example). The screen images 300a to 300c shown in FIG. 3 indicate the manner how occurring failures increase with time.

Hence, the display subprogram 104 successively and sequentially displays a plurality of screen images 300 as of a plurality of different Times 3 between Time 1 and Time 2 so that the user can note the situation of failures from Time 1 to Time 2 by animation.

During the play of the screen images 300, the information indicating Time 3 (the black triangles in FIG. 3) moves from Time 1 to Time 2.

To indicate occurrence of a failure event of urgent need, the monitoring screen displays the same screen image 300 for a certain period. That is to say, the display subprogram 104 stops the animation for a while. The user specifies the pause time for the animation at any length. During the pause of the animation, the display subprogram 104 may highlight the symbol or figure for the monitoring target apparatus in which the failure of urgent need occurs.

In Embodiment 1, the display subprogram 104 shows the situations of failures occurring in the monitoring target apparatuses 30 successively from discretional Time 1 to Time 2, so that the user can easily grasp when the failures occurred in the monitoring target apparatuses 30. Furthermore, the user can also grasp the order of occurrence of the failures in the plurality of monitoring target apparatuses 30, which can be helpful to identify the root cause.

For example, the user can identify the monitoring target apparatus 30 where the first failure occurred and further identify other monitoring target apparatuses 30 where failures occurred because of the effects of the first failure. Hence, the user can identify the root cause of the failures.

The display subprogram 104 in Embodiment 1 holds a screen image for a while to keep showing the single image when an event of urgent need has occurred, so that the user can immediately grasp the failure event in a monitoring target apparatus 30 to be finished with high priority.

FIG. 4 is an explanatory diagram illustrating the event information 106 in Embodiment 1.

The event information 106 stores failure events collected from the monitoring target apparatuses 30. The event information 106 includes at least event IDs 161, occurrence dates and times 162, host names 163, statuses of troubleshooting 164, and troubleshooting times 165.

Each event ID 161 is a predefined identifier assigned in accordance with the phenomenon and specifics of a failure event that occurred. Each occurrence date and time 162 indicates the date and time a failure occurred. Each host name 163 indicates the monitoring target apparatus 30 in which the failure occurred.

Each status of troubleshooting 164 indicates whether the failure identified by the failure event has been finished or has not been finished by the user. The status "unfinished" means that troubleshooting has not finished yet and the failure has not been removed yet. The status "finished" means that troubleshooting has finished and the failure has been removed.

Each troubleshooting time 165 indicates a time after a failure event has occurred until troubleshooting of the failure identified by the failure event finishes.

The event acquisition subprogram 101 updates an event ID 161, an occurrence date and time 162, and a host name 163 based on an acquired failure event. The event update subprogram 102 updates a status of troubleshooting 164 and a troubleshooting time 165 in accordance with inputs from the user.

FIG. 5 is an explanatory diagram illustrating the display information 108 for displaying monitoring target apparatuses 30 in Embodiment 1.

The display information 108 stores coordinates indicating the positions of the monitoring target apparatuses 30 in the screen images output by the display apparatus 20. The display information 108 includes host names 181, coordinates 182, and update dates and times 183.

Each host name 181 identifies a monitoring target apparatus 30 and corresponds to a host name 163 in the event information 106.

Each pair of coordinates 182 indicates the position to show information representing a monitoring target apparatus 30 in the screen images. The coordinates 182 are specified by the user. It should be noted that, when the user inputs coordinates, the program held by the display apparatus 20 may output an alert to the input/output device 24 to avoid displaying a plurality of monitoring target apparatuses 30 at the same position.

Each update date and time 183 indicates the date and time when the user specifies the coordinates 182.

When a monitoring target apparatus 30 is deleted or when the user inputs an instruction to exclude a monitoring target apparatus 30 from the screen images 300 to the monitoring apparatus 10, the program in the monitoring apparatus 10 deletes the entry representing the deleted or excluded monitoring target apparatus 30 from the display information 108 in FIG. 5.

When the position to show a monitoring target apparatus 30 is moved, the display information 108 may keep both coordinates before and after the move. For this reason, the display information 108 may have entries indicating a plurality of pairs of coordinates associated with one monitoring target apparatus 30.

FIG. 6 is an explanatory diagram illustrating screen image information 109 in Embodiment 1.

The screen image information 109 stores information required to display screen images at given times in the designated period. The screen image creation subprogram 103 creates the screen image information 109 upon receipt of the designated period. The screen image information 109 includes indication times 191, indication information 192, and pause times 193.

Each indication time 191 indicates the time the situation of failures shown in a screen image 300 actually occurs. The indication time 191 in Embodiment 1 corresponds to Time 3 in FIG. 3.

Each piece of indication information 192 indicates the specifics shown in the screen image as of the time indicated by an indication time 191. Specifically, the indication information 192 indicates the positions to show the information representing the monitoring target apparatuses 30 and whether to show information representing failures, if any failure occurs in the monitoring target apparatuses 30.

In the following description, the position to show a monitoring target apparatus 30 and the position to show a failure occurring in the same monitoring target apparatus 30 are the same. If the position to show the failure is different from the position of the monitoring target apparatus 30, the indication information 192 may hold a method for obtaining the position to show the failure with reference to the position to show the monitoring target apparatus 30.

Each pause time 193 indicates, in successively displaying screen images, the time of keeping a screen image as of the time specified by an indication time 191 on the monitoring screen to pause the animation. The pause times 191 in FIG. 6 indicate times in units of seconds.

The pause times 193 in FIG. 6 indicate times to be added to the minimum time required for each screen image to play the animation. Accordingly, the pause times 193 can indicate "0 seconds".

FIG. 7 is an explanatory diagram illustrating the event mapping information 110 in Embodiment 1.

The event mapping information 110 indicates conditions for failure events required to pause the animation and times of suspending the animation. The event mapping information 110 is specified by the user. The event mapping information 110 includes event IDs 111, host names 112, and pause times 113.

Each event ID 111 is an identifier predefined in accordance with the phenomenon and specifics of a failure event that occurs and corresponds to an event ID 161 in the event information 106.

Each host name 112 indicates a monitoring target apparatus 30. The host names 112 correspond to host names 163 in the event information 106 and host names 181 in the display information 108.

Each pause time 113 indicates a time of suspending the animation. The pause times 113 indicate the times in units of seconds.

In the event mapping information 110 shown in FIG. 7, the pause times are determined depending on the event ID 111 and the host name 112; however, the pause times in this embodiment may be determined depending on other information.

Figure 8A:
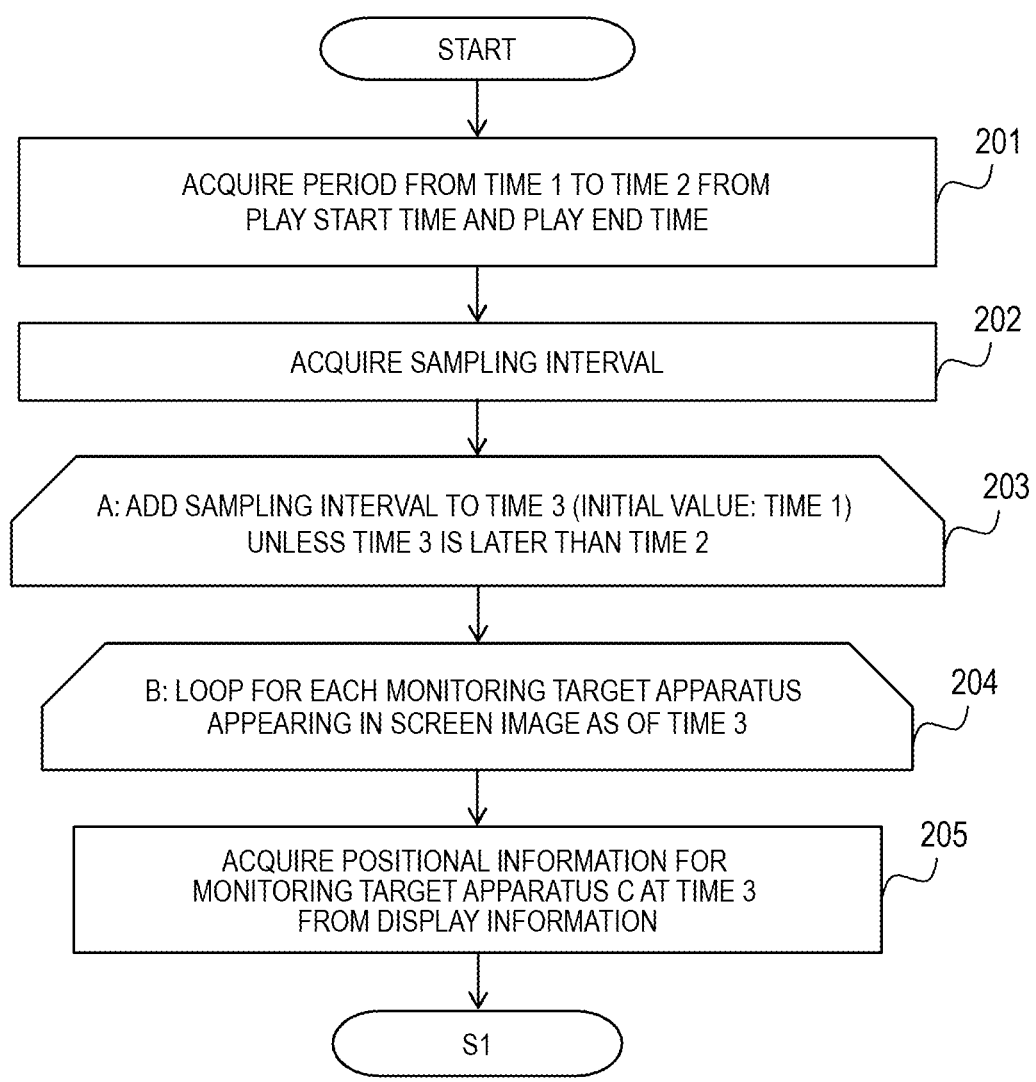
FIG. 8A is a flowchart illustrating the first half of the processing performed by a screen image creation subprogram in Embodiment 1.

FIG. 8A is a flowchart illustrating the first half of the processing performed by the screen image creation subprogram 103 in Embodiment 1.

When the user specifies a play start time and a play end time with the input/output device 24 of the display apparatus 20, the screen image creation subprogram 103 acquires Time 1 from the play start time and Time 2 from the play end time (201).

After Step 201, the screen image creation subprogram 103 acquires a sampling interval the user has specified with the input/output device 24 (202). The sampling interval in this embodiment means a time interval between times to create images within the designated period.

As the sampling interval is shorter, the screen images 300 to be displayed per unit time in the designated period increases, so that the accuracy in indicating the situation of failures increases. In this case however, because of the increase in the number of screen images 300 required to play the animation, the time required to create the screen images 300 increases.

On the other hand, as the sampling interval is longer, the screen images 300 to be displayed per unit time in the designated period decreases, so that the accuracy in indicating the situation of failures decreases. In this case however, because of the decrease in the number of screen images 300 required to play the animation, the time required to create the images 300 decreases.

After Step 202, the screen image creation subprogram 103 performs loop processing A. In the loop A, the screen image creation subprogram 103 performs loop processing B and Step 212 after each sampling interval.

At each start of the loop A, the screen image creation subprogram 103 calculates Time 3 based on Time 1 and the sampling interval (203). For Time 3, the initial value is Time 1. The screen image creation subprogram 103 adds a sampling interval to Time 3 at every repeat of the loop A.

The screen image creation subprogram 103 creates a screen image 300 as of Time 3 in accordance with the loop B and Step 212. If the calculated Time 3 is later than Time 2, the screen image creation subprogram 103 terminates the loop processing A.

After Step 203, the screen image creation subprogram 103 calculates the number of monitoring target apparatuses 30 to appear in the screen image as of Time 3 and repeats Steps 205 to 211 as many times as the calculated number of monitoring target apparatuses 30.

At the start of the loop processing B, the screen image creation subprogram 103 calculates the number of monitoring target apparatuses 30 identified by the host names 181 in the entries of the display information 108. Then, the screen image creation subprogram 103 acquires the calculated number as the number of monitoring target apparatuses 30 to appear in the screen image as of Time 3 (204).

At Step 204, the screen image creation subprogram 103 selects a monitoring target apparatus 30 for which the processing at Step 205 and subsequent steps has not been performed as a monitoring target apparatus C from the monitoring target apparatuses 30 identified by the host names 181 in the display information 108.

After Step 204, the screen image creation subprogram 103 acquires a pair of coordinates 172 for the monitoring target apparatus C at Time 3 (205). That is to say, the screen image creation subprogram 103 acquires positional information where to show the monitoring target apparatus C at Time 3.

Figure 8B:
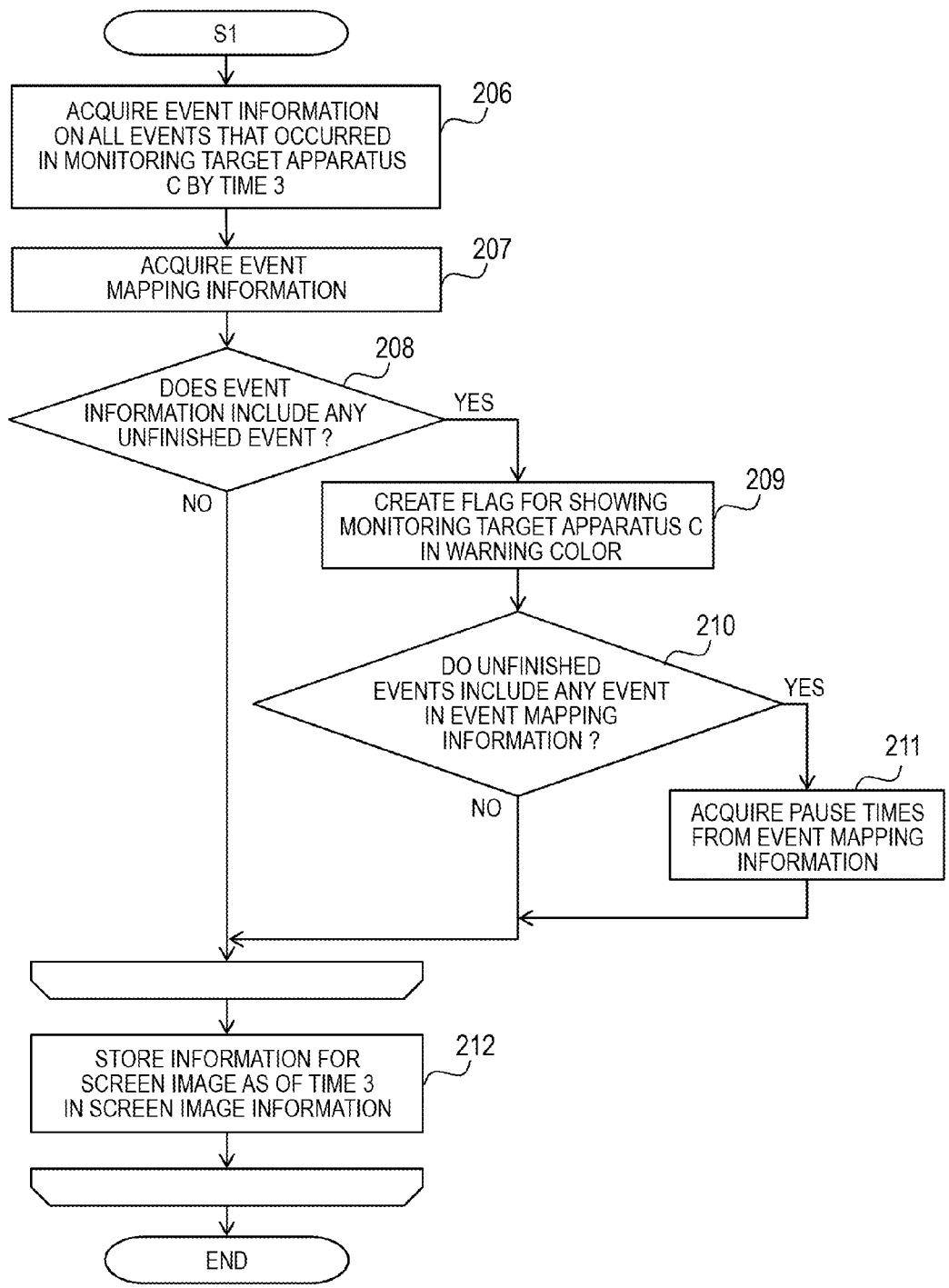
FIG. 8B is a flowchart illustrating the second half of the processing performed by the screen image creation subprogram in Embodiment 1.

FIG. 8B is a flowchart illustrating the second half of the processing performed by the screen image creation subprogram 103 in Embodiment 1.

After Step 205, the screen image creation subprogram 103 refers to the occurrence dates and times 162 and the host names 163 in the event information 106 to acquire all entries representing the failure events that occurred in the monitoring target apparatus C by Time 3 from the event information 106 (206).

After Step 206, the screen image creation subprogram 103 acquires, from the event mapping information 110, all entries including the event IDs and host names matching the event IDs 161 and host names 163 of the entries acquired at Step 206 (207).

After Step 207, the screen image creation subprogram 103 determines whether any entry indicating "unfinished" in the status of troubleshooting 164 exists among the entries of failure events acquired at Step 206 (208).

If some entry indicating "unfinished" in the status of troubleshooting 164 exists, the screen image creation subprogram 103 creates a flag to show the monitoring target apparatus C with a warning colored figure representing a failure and holds the created flag in association with the monitoring target apparatus C (209).

After Step 209, the screen image creation subprogram 103 determines whether any entries corresponding to the failure events that are unfinished can be identified among the entries of the event mapping information 110 acquired at Step 207 (210).

Specifically, the screen image creation subprogram 103 determines whether any entries in the event mapping information 110 can be identified, which correspond to the entries in the event information 106 in which the status of troubleshooting 164 indicates "unfinished" and the event ID 161 and the host name 163 match the event ID 111 and the host name 112 acquired at Step 207.

In this step, the screen image creation subprogram 103 may identify entries in which at least either the event ID or the host ID matches.

If some entry corresponding to an unfinished failure event can be identified from the entries of the event mapping information 110 acquired at Step 207, the screen image creation subprogram 103 acquires the pause time 113 of the identified entry in the event mapping information 110 as the pause time for the monitoring target apparatus C in the screen image as of Time 3 (211).

If a plurality of pause times 113 are acquired at Step 211, the screen image creation subprogram 103 adopts the longest pause time 113 as the pause time for the monitoring target apparatus C in the screen image as of Time 3.

The pause time 113 may be 0 seconds. For example, none of the unfinished failure events matches the conditions specified with the event IDs 111 and the host names 112 in the event mapping information 110, the screen image creation subprogram 103 may determine the pause time to be 0 seconds.

If the determination at Step 208 is that no entry indicating "unfinished" in the status of troubleshooting 164 exists among the entries of the failure events acquired at Step 206, if the determination at Step 210 is that entries corresponding to the unfinished failure events cannot be identified among the entries of the event mapping information 110 acquired at Step 207, or after Step 221, the screen image creation subprogram 103 returns to Step 204 in accordance with the loop B.

After applying Steps 205 to 211 to all the monitoring target apparatuses 30 at Time 3 in accordance with the loop B, the screen image creation subprogram 103 stores information on the screen image to be displayed at Time 3 in the screen image information 109 (212).

Specifically, the screen image creation subprogram 103 stores Time 3 in the indication time 191. The screen image creation subprogram 103 further stores the positional information for the monitoring target apparatuses 30 acquired at Step 205 and the flags created at Step 209 in the display information 192.

The screen image creation subprogram 103 updates the pause time 193 with the pause time for the monitoring target apparatus C in the screen image as of Time 3 acquired at Step 211. However, the screen image creation subprogram 103 does not need to store the pause time for the monitoring target apparatus C in the pause time 193 if the pause time 193 already holds a time longer than the pause time for the monitoring target apparatus C.

After Step 211, the screen image creation subprogram 103 returns to Step 203. The screen image creation subprogram 103 then performs Steps 204 to 211 for all the Times 3 included in the designated period in accordance with the loop A. Upon completion of the processing of the loop A, the screen image creation subprogram 103 terminates the processing illustrated in FIGS. 8A and 8B.

Through the processing illustrated in FIGS. 8A and 8B, information specifying the screen images to be displayed for the designated period is stored in the screen image information 109.

Figure 9:
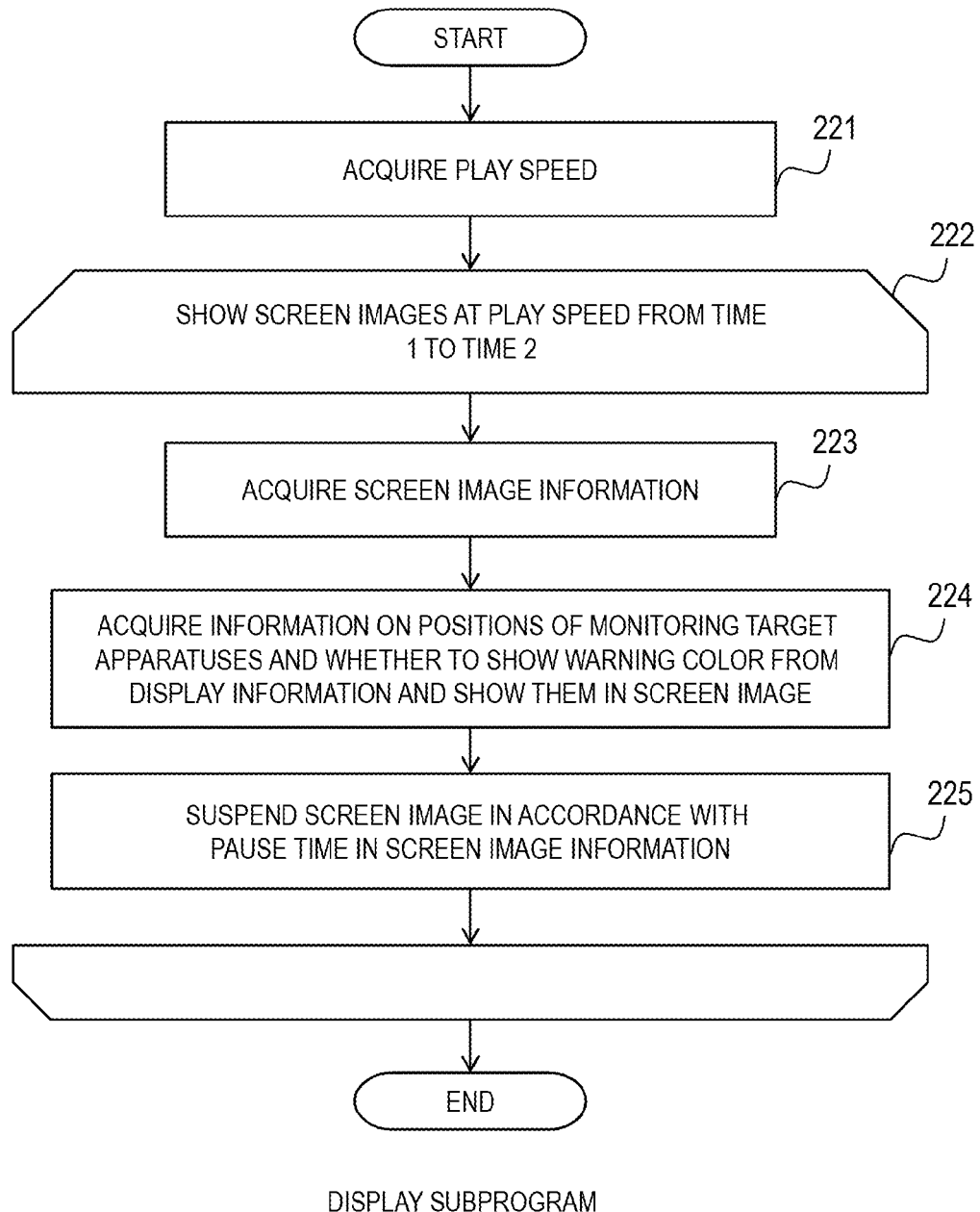
FIG. 9 is a flowchart illustrating the processing of a display subprogram in Embodiment 1.

FIG. 9 is a flowchart illustrating processing of the display subprogram 104 in Embodiment 1.

The display subprogram 104 performs the processing illustrated in FIG. 9 after the processing illustrated in FIGS. 8A and 8B. The display subprogram 104 may perform the processing in FIG. 9 in accordance with an instruction from the user or periodically.

The display subprogram 104 first acquires a play speed predetermined by the user from the storage device 13 (221).

After Step 221, the display subprogram 104 executes loop processing D in accordance with the acquired play speed. At each start of the loop D, the display subprogram 104 selects an entry of the screen image information 109 including the earliest indication time 191 (222). The entry selected at this step is referred to as entry D.

The display subprogram 104 acquires the entry D in the display image information 109 (223). After Step 223, the display subprogram 104 creates screen image data for showing a screen image as of the indication time 191 of the entry D in accordance with the indication information 192 of the entry D. Then, the display subprogram 104 inputs the created image data to the display apparatus 20 to display the screen image (224).

Upon receipt of the screen image data from the monitoring apparatus 10, the display apparatus 20 displays a screen image 300 using the transmitted screen image data and the input/output device 24. The display apparatus 20 successively displays the sequentially transmitted screen image data in order of transmission to play an animation. The display apparatus 20 may replace the screen images 300 one by one to successively display the screen image data or arrange the screen images 300 side by side on the screen to show the user the changes in the situation of failures over time.

The display apparatus 20 further shows a warning color or other appearance indicating a failure at the positions of monitoring target apparatuses 30 in the screen image 300 based on the information for the flags included in the transmitted image data.

After Step 224, the display subprogram 104 keeps showing the screen image on the display apparatus 20 in accordance with the pause time 193 of the entry D. That is to say, the display subprogram 104 holds the screen image on the display apparatus 20 for the pause time 193 (225).

After Step 225, the display subprogram 104 repeats the loop D in accordance with the play speed to show the screen images in the designated period by animation.

The processing illustrated in FIG. 9 is to display screen images created by the display subprogram 104 on the display apparatus 20 whenever ready in accordance with the play speed; however, the display subprogram 104 may show the screen images on the display apparatus 20 when all screen images for the designated period are created.

Specifically, the display subprogram 104 may store the created screen image data in a cache; after creating screen image data corresponding to all the entries in the screen image information 109, it sends the screen image data stored in the cache and the pause times 193 to the display apparatus 20. The display subprogram 104 may show the plurality of screen images on the display apparatus 20 in accordance with the play speed and the pause times 193.

In Embodiment 1, the monitoring apparatus 10 shows failure events unfinished at the current time among the failure events that occurred by Time 2 by animation. As a result, the user can visually and speedily grasp the occurrence times of unfinished failure events.

The monitoring apparatus 10 in this embodiment displays the monitoring target apparatuses 30 based on the positional information, so that the user can visually and speedily grasp the locations of the monitoring target apparatuses 30 in which failure events occurred.

The display subprogram 104 in Embodiment 1 pauses the animation depending on the specifics of the failure event. Accordingly, the user can quickly grasp occurrence of a significant failure event to be noted. Furthermore, the display subprogram 104 in Embodiment 1 sequentially shows screen images from Time 1 to Time 2. As a result, the user can easily and visually note the order of occurrence of failures in a plurality of monitoring target apparatuses 30.

Embodiment 2

The monitoring apparatus 10 in Embodiment 2 shows only the failure events that occurred in the designated period from Time 1 to Time 2 on the monitoring screen. The monitoring apparatus 10 in Embodiment 2 shows the failure events that occurred in the monitoring target apparatuses 30 in different ways depending on the severity or other criterion.

The computer system and the monitoring system in Embodiment 2 have the same configurations as the computer system and the monitoring system illustrated in FIG. 1.

Figure 10:
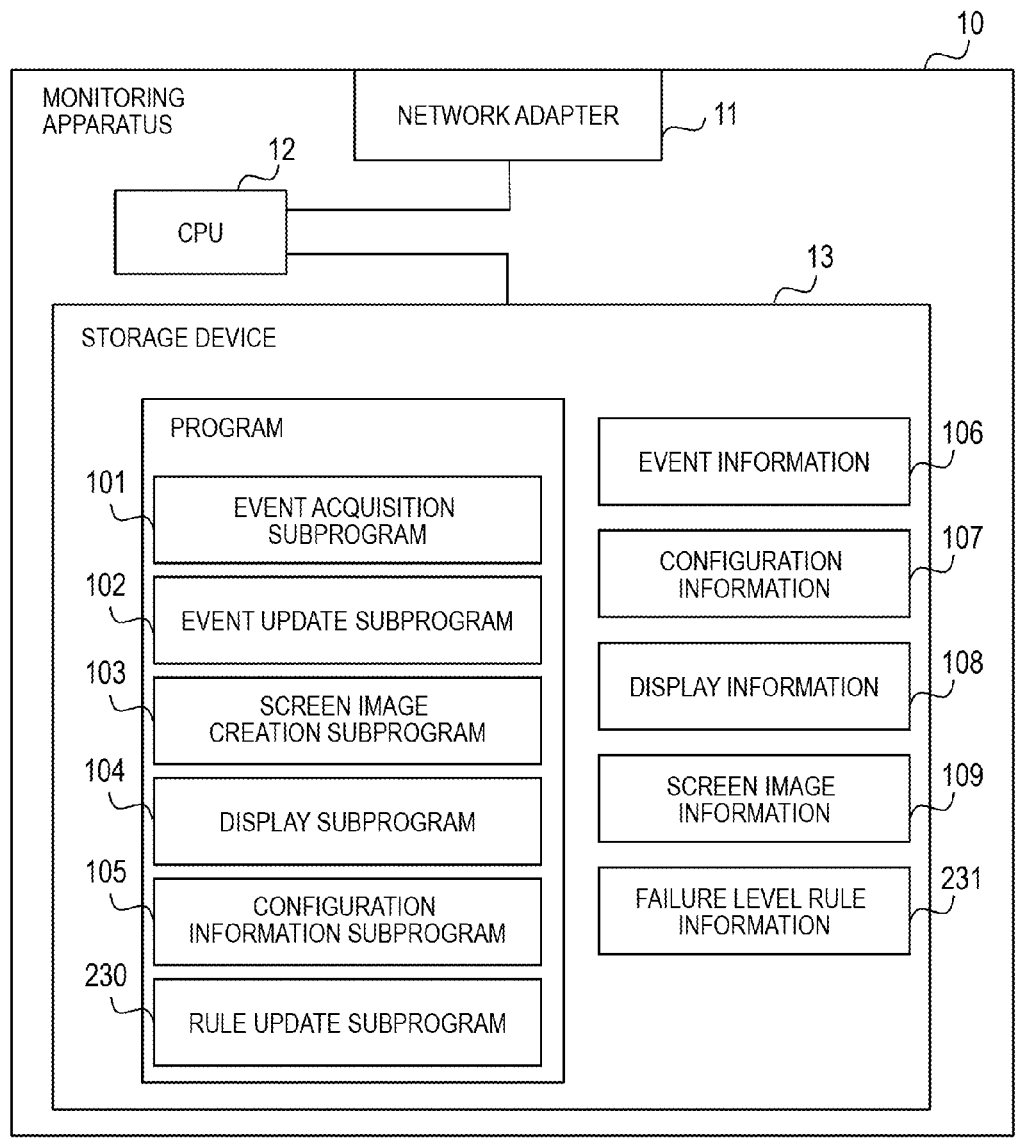
FIG. 10 is a block diagram illustrating a configuration of a monitoring apparatus in Embodiment 2.

FIG. 10 is a block diagram illustrating a configuration of the monitoring apparatus 10 in Embodiment 2.

The storage device 13 in Embodiment 2 includes a program including an event acquisition subprogram 101, an event update subprogram 102, a screen image creation subprogram 103, a display subprogram 104, a configuration information subprogram 105, and a rule update subprogram 230. The storage device 13 also includes data including event information 106, configuration information 107, display information 108, screen image information 109, and failure level rule information 231.

The event acquisition subprogram 101, the event update subprogram 102, and the configuration information subprogram 105 in Embodiment 2 are the same as the programs denoted by the same reference signs in Embodiment 1. The event information 106 and the configuration information 107 in Embodiment 2 are the same as the data denoted by the same reference signs in Embodiment 1.

The screen image information 109 in Embodiment 2 includes the indication time 191 and the indication information 192 in Embodiment 1. However, the indication time 191 in Embodiment 2 indicates the start time and the end time of the designated period in the column and the indication information 192 in Embodiment 2 includes values indicating the characteristics of graphics for representing failure levels of monitoring target apparatuses 30.

Figure 11:
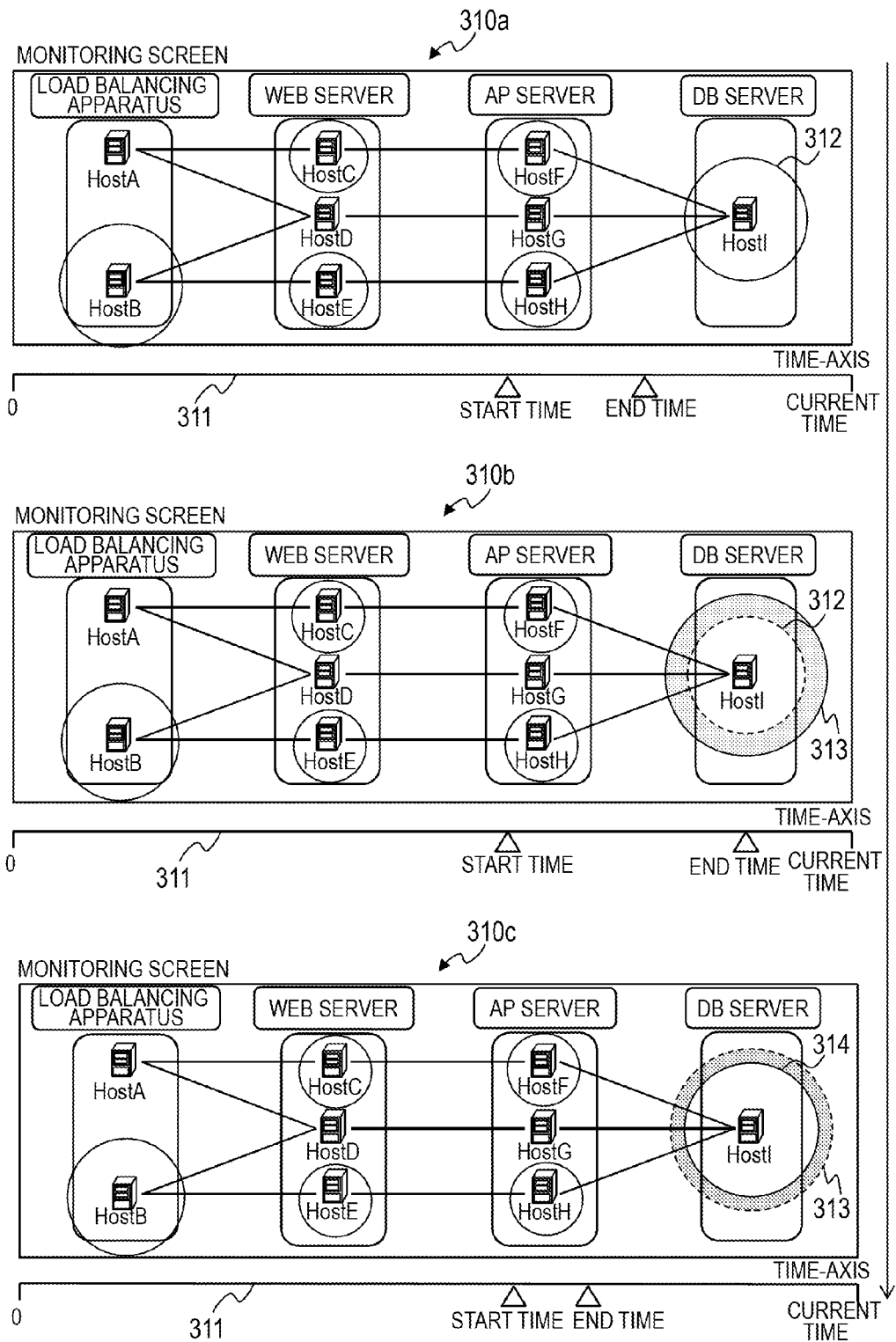
FIG. 11 is an explanatory diagram illustrating screen images each indicating a situation of failures in a discretional designated period in Embodiment 2.

FIG. 11 is an explanatory diagram illustrating screen images 310 each indicating a situation of failures in a discretional designated period in Embodiment 2.

In Embodiment 2, the user specifies Time 1 (start time) and Time 2 (end time) to define the designated period in Embodiment 2. Each screen image 310 shows failure levels of the failure events occurring in the designated period. The failure level in Embodiment 2 is a value calculated based on the occurrence time of the failure event and the severity of the failure event, representing the urgency level for the user.

The screen images 310 are different in the range showing a warning color, a figure, or a symbol to be added to the icon of each monitoring target apparatus 30 depending on the value of the failure level. Specifically, if a failure level in a previous image changes into a different one in a next image, the next screen image 310 indicates the extent of change by showing a figure, letter, symbol, pattern, color, or the like for capturing the attention of the user.

FIG. 11 illustrates transition of screen images 310 designated in order of the first designated period, the second designated period, and the third designated period.

The first designated period is shorter than the second designated period and longer than the third designated period. The user specifies the first designated period, the second designated period, and the third designated period in this order using the scroll bar 311.

When the user inputs the first designated period with the scroll bar 311, the input/output device 24 displays the screen image 310a. The screen image 310a shows a failure level 312 to indicate a failure level of a failure that occurred in the first designated period and has not been removed at the current time in the display area of HOST I of a monitoring target apparatus 30.

Thereafter, when the user inputs the second designated period with the scroll bar 311, the input/output device 24 displays the screen image 310b.

The screen image 310b shows a failure level 313 for the failure level of a failure that occurred in the second designated period and has not been removed at the current time in the display area of HOST I. Further, in order to indicate the extent of change from the failure level 312 to the failure level 313, the screen image 310b shows a distinctive color between the shape of the failure level 312 and the shape of the failure level 313.

When the user inputs the third designated period with the scroll bar 311, the input/output device 24 displays the screen image 310c.

The screen image 310c shows a failure level 314 for the failure level of a failure that occurred in the third designated period and has not been removed at the current time in the display area of HOST I. Further, in order to indicate the extent of change from the failure level 313 to the failure level 314, the screen image 310c shows a distinctive color between the failure level 313 and the failure level 314.

The screen image 310 indicates the failure level by a figure of circle, but indication of the failure level is not limited to this. The failure level may be indicated by any way, such as figure, symbol, pattern, color, or the like, as far as it can capture the user's attention. Further, the screen image 310 may also indicate the extent of change by any way.

The display apparatus 20 may have a speaker as the input/output device 24. If the failure level increases, the input/output device 24 may display the screen image 310 and further, output distinctive sound indicating the increase from the speaker.

The screen image 310 indicating the failure level and the extent of change in failure level enables the user to visually grasp the situation of failures that occurred during the designated period at sight and find a failure event in need of urgent solution at an earlier stage.

Furthermore, the screen image 310 indicating the extent of change in failure level enables the user to easily grasp the failure level by sight, so that the user can address a failure event of a high failure level that occurred in a monitoring target apparatus 30 with high priority.

Figures 12, 13:
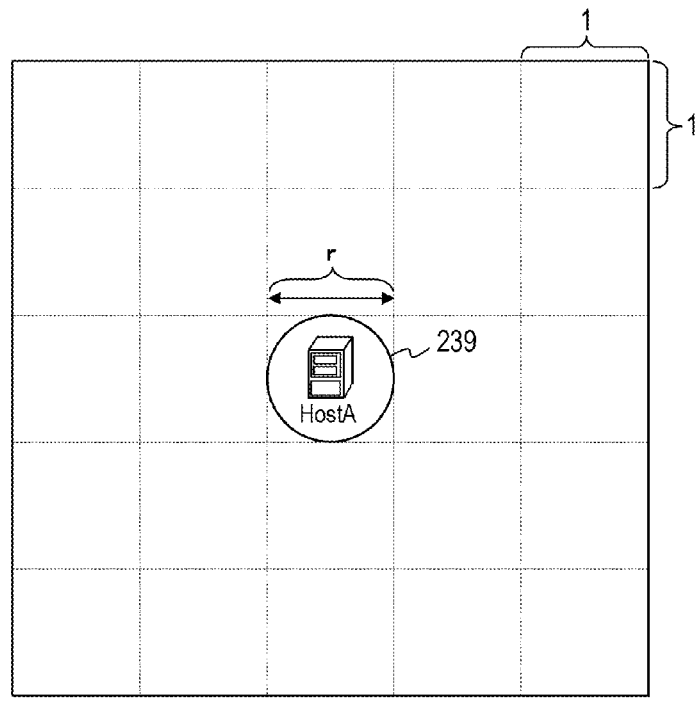
FIG. 12 is an explanatory diagram illustrating a figure representing a failure level of a monitoring target apparatus in Embodiment 2.
FIG. 13 is an explanatory diagram illustrating failure level rule information in Embodiment 2.

FIG. 12 is an explanatory diagram illustrating a figure representing a failure level of a monitoring target apparatus 30 in Embodiment 2.

The image 310 in FIG. 12 includes a circular FIG. 239 for a failure level. The screen image creation subprogram 103 determines the diameter r of the FIG. 239 to create the circular FIG. 239 indicating the failure level and the image 310 to be displayed.

The screen image creation subprogram 103 may express the change in failure level by way of change in color or pattern of the circle. The user may input the largest diameter and the smallest diameter for the circle to the monitoring apparatus 10 in advance. In the case where the largest diameter and the smallest diameter are input, the screen image creation subprogram 103 may predefine the association relations between diameters r and failure levels with respect to the largest diameter and the smallest diameter.

For example, the screen image creation subprogram 103 may determine the value to be incremented in the diameter at every increase in failure level based on the specified largest and smallest diameters and the highest failure level (which is predetermined). Specifically, the screen image creation subprogram 103 may round down the value obtained by ((the largest diameter−the smallest diameter)/ the total sum of the highest failure levels) at the second decimal place and hold the result as an increment (Δr) in the diameter.

In the case where the screen image 310 indicates the failure level by some way other than the circle, the screen image creation subprogram 103 may determine the size of the graphics using the above-mentioned diameter r or determine the volume of warning sound to be proportional to the diameter r.

Taking an example of a circle, if the user specifies the largest size of the circle representing the failure level, the screen image creation subprogram 103 in Embodiment 2 can prevent the circle from being so large that the user rather feels difficulty in understanding the failure level.

FIG. 13 is an explanatory diagram illustrating the failure level rule information 231 in Embodiment 2.

The failure level rule information 231 is used to calculate the failure level to be indicated in the screen image 310. The failure level rule information 231 includes event IDs 232, average trouble-shooting times 233, severities 234, and latest troubleshooting dates and times 235. The failure level rule information 231 is created based on the event information 106 in accordance with later-described processing of the rule update subprogram 102.

Each event ID 232 indicates the identifier of a failure event and corresponds to an event ID 161 of the event information 106.

Each average troubleshooting time 233 indicates an average time from occurrence of the failure event identified by an event ID 232 until removal of the cause of the failure event. If the average troubleshooting time is long, the failure event is generally a difficult failure and the urgency level to solve the failure is therefore high.

Each severity 234 is a value discretionally determined by the user. Each severity 234 indicates the severity of the failure event identified by an event ID 232.

Each severity 234 in FIG. 13 indicates a message such as "URGENT", "ERROR", or "ALERT". Each message is assigned a failure level. For example, "URGENT" is assigned a failure level "5"; "ERROR" is assigned "2".

Each latest troubleshooting date and time 235 indicates the date and time when the failure event identified by an event ID 232 was removed at the latest.

The failure level is determined based on the average troubleshooting time 233, the severity 234, and the latest troubleshooting date and time 235, so that the size of the figure to appear in the screen image 310 is determined.

It should be noted that, to a failure event to be solved promptly, a high failure level is assigned. The failure level rule information 231 may hold any indices other than the foregoing average troubleshooting time 233, severity 234, and the like; for example, it may include the number of occurrences of the failure event.

Figure 14:
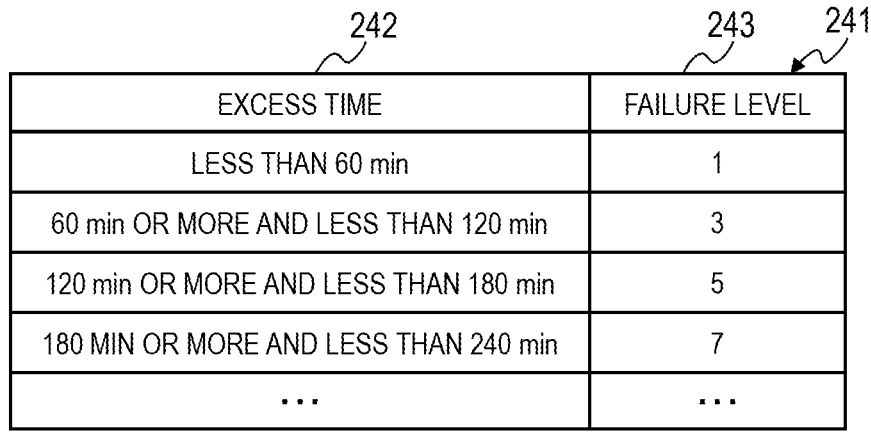
FIG. 14 is an explanatory diagram illustrating troubleshooting time-based levels in Embodiment 2.

FIG. 14 is an explanatory diagram illustrating troubleshooting time-based levels 241 in Embodiment 2.

The troubleshooting time-based levels 241 hold the association relation of the time difference between the average troubleshooting time and the time for which troubleshooting has not finished and the failure level. The troubleshooting time-based levels 241 include excess times 242 and failure levels 243.

Each excess time 242 is a difference between an average troubleshooting time and the time for which troubleshooting has not finished. Specifically, the excess time 242 corresponds to the value obtained by subtracting an average troubleshooting time 233 in the failure level rule information 231 from the time from the date and time of occurrence of a failure (corresponding to the date and time of occurrence in the event information 106) until the current time. Each failure level 243 indicates the failure level assigned to the excess time.

If troubleshooting of the failure has not finished yet and the time from the date and time of occurrence of the failure until the current time is longer than the average troubleshooting time, the monitoring apparatus 10 should be displayed with highlight to indicate urgent need to solve the occurring failure. Accordingly, as the time indicated by the excess time 242 is longer in FIG. 14, the value of the failure level 243 is greater. However, the user can discretionally select the failure level to be assigned.

For example, if the time from the date and time of occurrence of a failure until the current time is longer than the average troubleshooting time by 60 minutes or more and less than 120 minutes, the user may assign a failure level 2. If the time from the date and time of occurrence of a failure until the current time is longer than the average troubleshooting time by 120 minutes or more and less than 180 minutes, the user may assign a failure level higher than 2.

Figure 15:
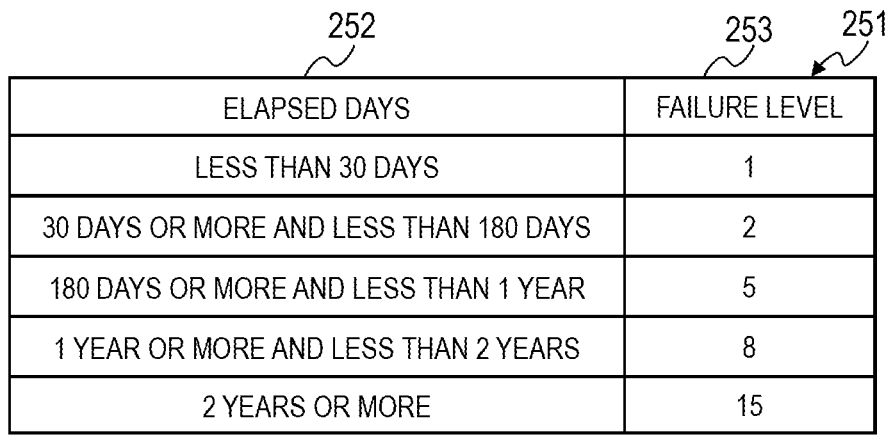
FIG. 15 is an explanatory diagram illustrating latest troubleshooting date-based levels in Embodiment 2.

FIG. 15 is an explanatory diagram illustrating latest troubleshooting date-based levels 251 in Embodiment 2.

The latest troubleshooting date-based levels 251 hold the numbers of days elapsed from the latest troubleshooting date and time and failure levels. Each field of elapsed days 252 indicates the number of days from the latest troubleshooting date and time 235 in the failure level rule information 231 until the current time. Each failure level 235 indicates a failure level assigned to the elapsed days.

In general, when the elapsed days are longer, the failure is not likely to be addressed properly since the troubleshooting method for the failure is old or lost. Accordingly, as the number of days indicated in the elapsed days 252 is greater in FIG. 15, the value of the failure level 253 is greater.

Figure 16:
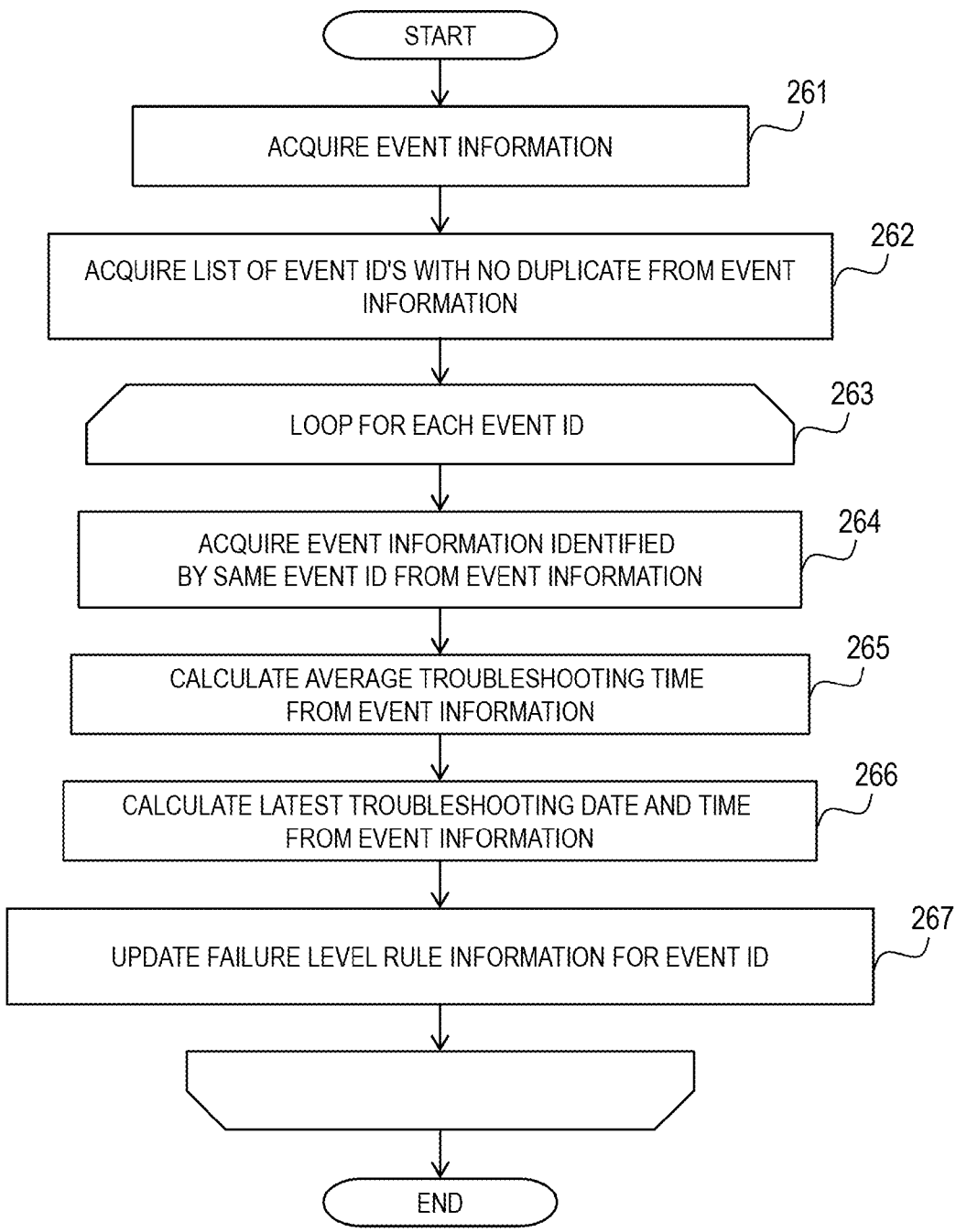
FIG. 16 is a flowchart illustrating the processing of a rule update subprogram in Embodiment 2.

FIG. 16 is a flowchart illustrating the processing of the rule update subprogram 230 in Embodiment 2.

The processing illustrated in FIG. 16 is performed periodically or in response to an instruction of the user. Alternatively, the processing in FIG. 16 may be performed when the monitoring apparatus 10 receives a failure event.

The rule update subprogram 230 acquires the event information 106 (261). After Step 261, the rule update subprogram 230 acquires the event IDs 161 in the event information 106. Then, the rule update subprogram 230 excludes duplicate event IDs from the acquired event IDs 161 to create a list of event IDs. The rule update subprogram 230 calculates the number of event IDs in the event ID list (262).

After Step 262, the rule update subprogram 230 repeats the processing from Step 264 to Step 267 as many times as the calculated number of event IDs. Specifically, the rule update subprogram 230 selects an event ID on which the processing from Step 264 to Step 267 has not been performed from the event ID list (263).

After Step 263, the rule update subprogram 230 acquires all entries including the event ID 161 indicating the selected event ID from the event information 106 (264). It should be noted that the rule update subprogram 230 may exclude the entries indicating "unfinished" in the troubleshooting status 164 from the event ID list.

After Step 264, the rule update subprogram 230 calculates an average troubleshooting time based on the troubleshooting statuses 164 and the troubleshooting times 165 of all the acquired entries (265).

After Step 265, the rule update subprogram 230 calculates the latest troubleshooting date and time based on the occurrence dates and times 162, the troubleshooting statuses 164, and the troubleshooting times 165 of all the acquired entries. Specifically, the rule update subprogram 230 obtains the latest troubleshooting date and time by adding the troubleshooting time 165 to the occurrence date and time 162 of each entry indicating "finished" in the status of troubleshooting 164 (266).

In the case where the failure level rule information 231 includes the number of failure events as an index of the failure level, the rule update subprogram 230 calculates the number of all acquired entries and stores it in the failure level rule information 231.

After Step 266, the rule update subprogram 230 stores the selected ID in the event ID 232 of a new entry in the failure level rule information 231, stores the average troubleshooting time calculated at Step 265 in the average troubleshooting time 233, and stores the date and time calculated at Step 266 in the latest troubleshooting date and time 235 (267).

At Step 267, the rule update subprogram 230 may request the display apparatus 20 to output a screen image for assigning a severity to the selected event ID and receive a severity to be assigned to the selected event ID from the user. The rule update subprogram 230 may store the received severity in the severity 234 of the new entry.

After Step 267, the rule update subprogram 230 returns to Step 263 and selects a new event ID.

Through the processing illustrated in FIG. 16, the failure level rule information 231 is created. The created failure level rule information 231 enables the monitoring apparatus 10 in Embodiment 2 to calculate a failure level using the indices specified by the user.

Figure 17:
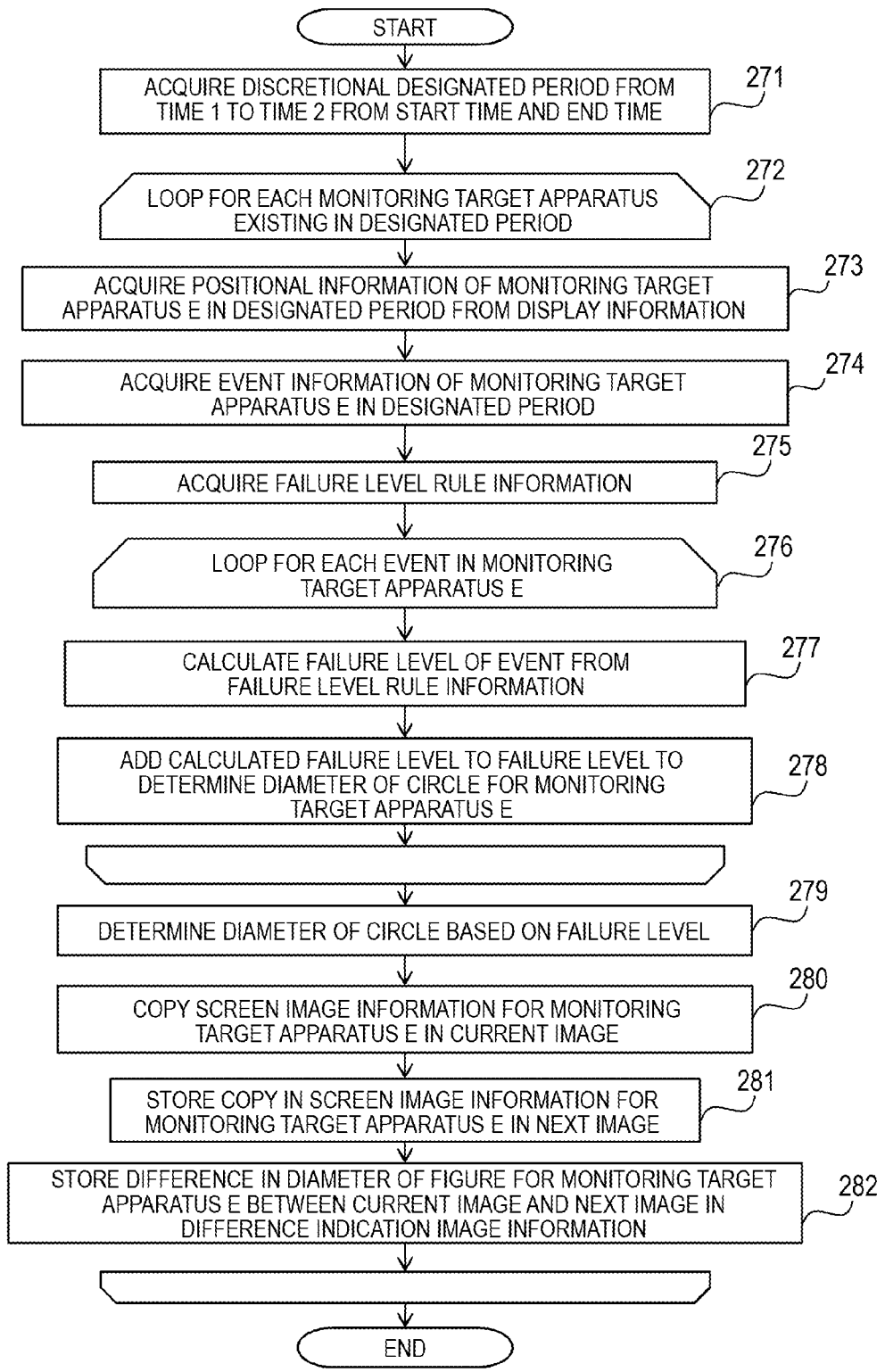
FIG. 17 is a flowchart illustrating the processing of a screen image creation subprogram in Embodiment 2.

FIG. 17 is a flowchart illustrating the processing of the screen image creation subprogram 103 in Embodiment 2.

First, the screen image creation subprogram 103 acquires a start time and an end time specified with the scroll bar 311 on the screen image 310 as Time 1 and Time 2, respectively. As a result, the screen image creation subprogram 103 acquires the designated period of the period from Time 1 to Time 2 (271).

After Step 271, the screen image creation subprogram 103 performs the processing from Step 273 to Step 282 on each of the monitoring target apparatuses 30 existing in the designated period.

After Step 271, the screen image creation subprogram 103 first acquires positional information in the screen image 310 for the monitoring target apparatuses 30 existing in the designated period from the display information 108. Specifically, the screen image creation subprogram 103 acquires all the monitoring target apparatuses 30 that are not added after Time 2 from the display information 108.

Then, the screen image creation subprogram 103 selects a monitoring target apparatus 30 on which the processing of Step 273 and subsequent steps have not been performed (hereinafter, referred to as monitoring target apparatus E) from the acquired monitoring target apparatuses 30 (272).

After Step 272, the screen image creation subprogram 103 acquires the coordinates 182 from the entry of the display information 108 representing the monitoring target apparatus E (273).

After Step 273, the screen image creation subprogram 103 acquires all entries of the event information 106 that represent the failure events that occurred in the monitoring target apparatus E during the designated period and are not finished at the current time (274). If no failure event can be acquired at Step 274, the screen image creation subprogram 103 returns to Step 272 and selects a new monitoring target apparatus 30.

After Step 274, the screen image creation subprogram 103 acquires all entries of the failure level rule information 231 in which the event IDs 232 matches the event IDs 161 of the entries acquired at Step 274 (275).

After Step 275, the screen image creation subprogram 103 performs the processing of Steps 277 and 278 on each entry of the event information 106 acquired at Step 274. Specifically, the screen image creation subprogram 103 selects an entry on which the processing of Step 277 and subsequent steps has not been performed (hereinafter, referred to as event F) from the entries acquired at Step 274 (276).

After Step 276, the screen image creation subprogram 103 calculates a failure level of the event F (277).

Specifically, the screen image creation subprogram 103 calculates the time from the occurrence date and time 162 of the event F until the current time. Then, the screen image creation subprogram 103 subtracts the average troubleshooting time 233 for the event ID 161 corresponding to the event F from the calculated time to obtain an excess time. Then, the screen image creation subprogram 103 acquires the failure level assigned to the calculated excess time (corresponding to the excess time 242) from the failure level 243 in the troubleshooting time-based levels 241.

At Step 277, the screen image creation subprogram 103 further acquires failure levels assigned to the severity 234 and the latest troubleshooting date and time 235. Specifically, the screen image creation subprogram 103 acquires the failure level assigned to the latest troubleshooting date and time 235 for the event ID 161 corresponding to the event F from the failure level 253 in the latest troubleshooting date-based levels 251. Also, the screen image creation subprogram 103 acquires the failure level assigned to the severity 234 from the failure level held in advance.

Then, the screen image creation subprogram 103 calculates the total sum of the acquired failure levels at Step 277.

After Step 277, the screen image creation subprogram 103 adds the calculated total sum of failure levels to an indication failure level (278). The indication failure level here is a failure level to be used to calculate the diameter r of the circle to indicate the failure level of the monitoring target apparatus E. If a plurality of indices exist and a plurality of failure events exist, the indication failure level is a total sum of the failure levels. The indication failure level is held in the storage device 13.

After Step 278, the screen image creation subprogram 103 returns to Step 276 and selects a new entry.

Through Steps 276 to 278, the screen image creation subprogram 103 can determine the size of the figure for indicating the failure level for all the failure events that occurred in the monitoring target apparatus E during the designated period and have not been finished by the current time.

After Steps 276 to 278, the screen image creation subprogram 103 determines the diameter r of the circle for the monitoring target apparatus E in accordance with the calculated value of the indication failure level (279). The screen image creation subprogram 103 determines the diameter r of the circle for the monitoring target apparatus E based on the aforementioned association relations between diameters r and failure levels and the value of the indication failure level.

After Step 279, if the display apparatus 20 is currently displaying a screen image 310, the screen image creation subprogram 103 copies the entry of the screen image information 109 corresponding to the screen image 310 currently on the monitoring screen and stores the copy of the entry of the screen image information 109 (hereinafter, referred to as existing screen image information) in the storage device 13 (280). The existing screen image information includes a diameter r1 of the circle indicating the failure level of the monitoring target apparatus E currently appearing on the monitoring screen.

After Step 280, the screen image creation subprogram 103 creates screen image information 109 for a screen image to be displayed next (281). Specifically, the screen image creation subprogram 103 stores the positional information of the monitoring target apparatus E acquired at Step 273 and the diameter r of the circle indicating the failure level determined at Step 279 in the indication information 192 of the entry in the screen image information 109 in which the indication time 191 includes the designated period acquired at Step 271.

If, at Step 281, the screen image information 109 does not have an entry in which the indication time 191 indicates the designated period, the screen image creation subprogram 103 creates a new entry.

After Step 281, the screen image creation subprogram 103 compares the diameter r1 included in the existing screen image information acquired at Step 280 with the diameter r determined at Step 279 and stores the way to indicate the difference determined in accordance with the result of comparison in difference indication image information (282). The difference indication image information is a value held in the storage device 13.

For example, if the diameter r is larger than the diameter r1, the screen image creation subprogram 103 stores information for adding a color to indicate the increase in failure level to the space between the circumference of the circle (diameter r1) and the circumference of the circle (diameter r) for indicating the failure level of the monitoring target apparatus E as the indication way determined in accordance with the result of comparison in the difference indication image information.

After Step 282, the screen image creation subprogram 103 returns to Step 272 and selects a new monitoring target apparatus E.

Through the processing illustrated in FIG. 17, positional information of monitoring target apparatuses 30 to appear in the designated period and the diameters of the circles to indicate failure levels of those monitoring target apparatuses 30 are stored in the screen image information 109 in Embodiment 2.

The display subprogram 104 refers to the screen image information 109 and the difference indication image information to display the screen image 310b, for example, on the display device 20. The diameter for the failure level 312 is the diameter r1 in the foregoing example and the diameter for the failure level 313 is the diameter r in the foregoing example. The display subprogram 104 shows the space between the circle for the failure level 312 and the circle for the failure level 313 in the color specified by the indication way in the difference screen image information determined in accordance with the result of comparison.

In the case of a situation that the first failure event occurred before Time 1 and is not finished at the current time and the second same failure event occurred in the same monitoring target apparatus 30 during the period from Time 1 to Time 2, the display subprogram 104 in Embodiment 1 cannot display the accurate occurrence time of the failure event on the monitoring screen.

The display subprogram 104 in Embodiment 2 displays only the failure events which occurred from Time 1 to Time 2 on the screen image 310; accordingly, it displays the failure events which occurred from Time 1 to Time 2, independent from whether an event prior to Time 1 has been finished or not.

The monitoring apparatus 10 in Embodiment 2 uses a failure level calculated with indices such as conditions on troubleshooting and a severity of the failure to show a figure or other graphics representing the urgency level of a failure on the monitoring screen as a situation of failures. Accordingly, the user can accurately grasp the urgency level to solve the failure event that occurred in the designated period and is not finished through the screen image in Embodiment 2.

Embodiment 3

The monitoring system in Embodiment 3 displays screen images by animation like in Embodiment 1 and indicates failure levels like in Embodiment 2. The computer system in Embodiment 3 has the same configuration as the computer systems in Embodiments 1 and 2 illustrated in FIG. 1.

The program and data held in the storage device 13 in Embodiment 3 are the same as the program and data in Embodiment 2 illustrated in FIG. 10. However, the processing of the program and the specifics of the data in Embodiment 3 are different from those in Embodiment 2.

Figure 18:
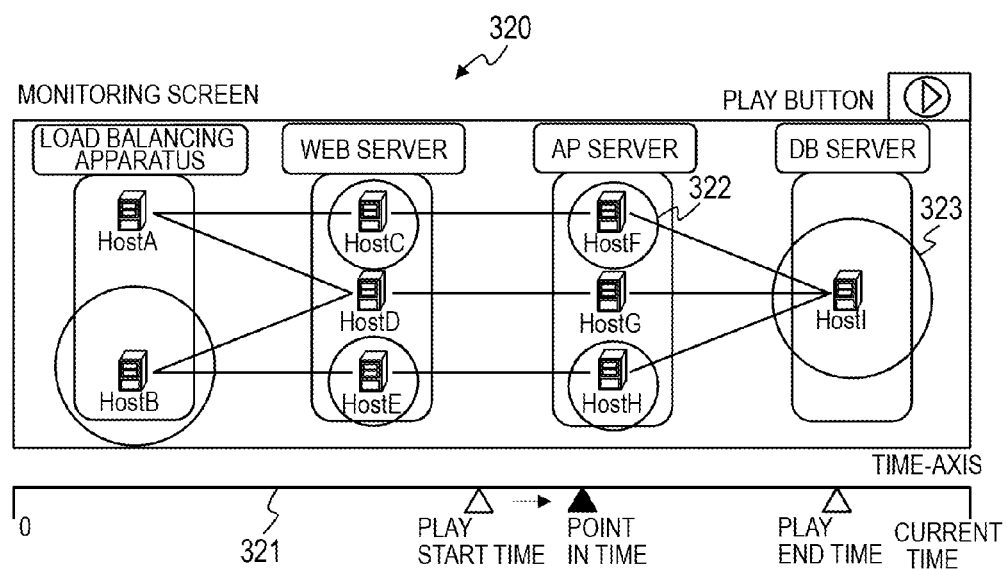
FIG. 18 is an explanatory diagram illustrating a screen image indicating a situation of failures in a designated period in Embodiment 3.

FIG. 18 is an explanatory diagram illustrating a screen image 320 for continuously showing the situation of failures from Time 1 to Time 2 in Embodiment 3.

The user inputs Time 1 (play start time), Time 2 (play end time), and Time 3 (point in time) through the scroll bar 321 on the screen image 320 displayed on the input/output device 24 of the display apparatus 20.

In Embodiment 3, failure events that occurred between Time 1 (play start time) and Time 2 (play end time) are displayed by animation through screen images 320 played in order of occurrence. A screen image 320 indicates the failure levels of the occurring failure events at Time 3 (point in time).

The screen image creation subprogram 103 in the following description displays the situation of failures by animation like Embodiment 1 and displays the failure levels like Embodiment 2. Unlike Embodiment 1, however, the screen image creation subprogram 103 in the following description does not pause the animation in accordance with the pause time 193 in the screen image information and does not keep showing the same screen image 320. Also, unlike Embodiment 2, the screen image creation subprogram 103 in the following description does not highlight the differences of the failure levels in the image from the failure levels in the previous image.

Figure 19A:
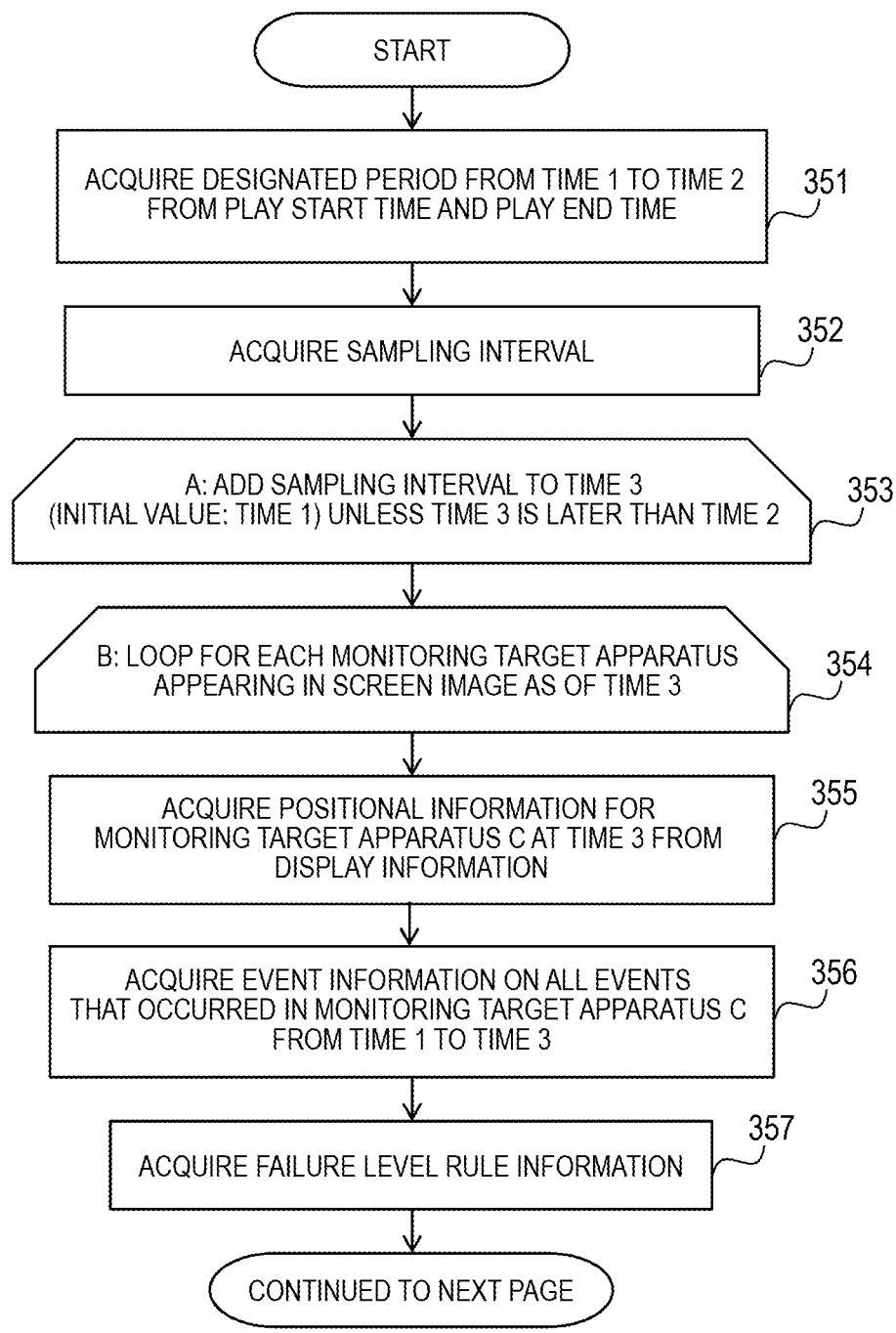
FIG. 19A is a flowchart illustrating the first half of the processing of a screen image creation subprogram in Embodiment 3.

FIG. 19A is a flowchart illustrating the first half of the processing of the screen image creation subprogram 103 in Embodiment 3.

Steps 351 to 355 are the same as Steps 201 to 205 shown in FIG. 8A.

After Step 355, the screen image creation subprogram 103 refers to the occurrence dates and times 162 and the host names 163 in the event information 106 to acquire all entries representing the failure events that occurred in the monitoring target apparatus C from Time 1 to Time 3 from the event information 106 (356).

After Step 356, the screen image creation subprogram 103 acquires all entries in the failure level rule information 231 in which the event IDs 232 match the event IDs 161 in the entries acquired at Step 356 (357).

Figure 19B:
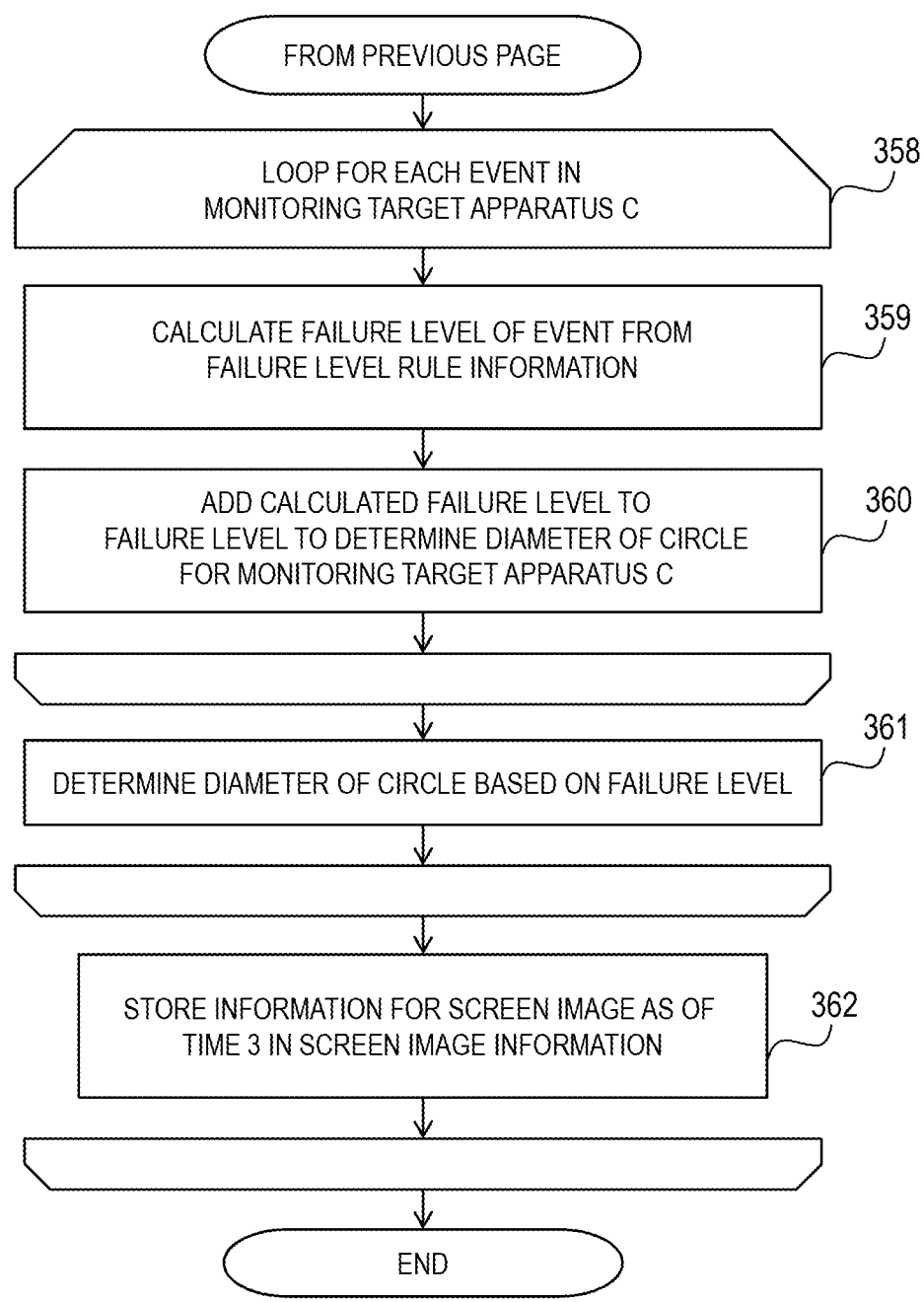
FIG. 19B is a flowchart illustrating the second half of the processing of the screen image creation subprogram in Embodiment 3.

FIG. 19B is a flowchart illustrating the second half of the processing of the screen image creation subprogram 103 in Embodiment 3.

Steps 358 to 361 are the same as Steps 276 to 279 shown in FIG. 17.

After completion of the processing of Steps 354 to 361, the screen image creation subprogram 103 creates screen image information 109 as of Time 3. Specifically, the screen image creation subprogram 103 stores Time 3 in the indication time 191 and stores positional information acquired at Step 355 and the diameter r of the circle determined at Step 361 in the indication information 192 (362).

After Step 362, the screen image creation subprogram 103 returns to Step 353. If Time 3 is later than Time 2, the screen image creation subprogram 103 terminates the processing shown in FIGS. 19A and 19B.

After completion of the processing shown in FIGS. 19A and 19B, the processing shown in FIG. 9 is performed so that the display subprogram 104 displays the figure indicating the failure level in the screen image 320 as of the time a failure occurred in some monitoring target apparatus 30.

It should be noted that the screen image creation subprogram 103 in Embodiment 3 may pause the animation in accordance with the pause time 193 in the screen image information, like Embodiment 1. In this case, Steps 208 to 211 in FIG. 8B may be performed at Step 356 in FIG. 19A.

Furthermore, the screen image creation subprogram 103 in Embodiment 3 may use the difference indication image information in Embodiment 2 to highlight the difference between the failure level in the previous image and the failure level in the next image by color or other way. In this case, the screen image creation subprogram 103 may perform Steps 280 to 282 after Step 361 to highlight the difference in failure level after every sampling interval.

Embodiment 3 displays screen images 320 to indicate the situation of failures corresponding to the failure events that occurred during the period designated by the user by animation and further indicates failure levels visually. As a result, the user can visually grasp changes in failure level during the designated period and further, can grasp the occurrence times and the order of occurrence of failures.

In the foregoing description, data required to execute programs of the embodiments has been referred to as "aaa information". However, the data may be held in the storage device 13 in any data structure. For example, the event information 106 may be an "event list" held in the structure of a list or may be an "event DB" held in the structure of a database.

Furthermore, in describing specifics of information, they have been referred to as "identifier", "name", and "ID"; however, these are replaceable with one another.

In the foregoing description, a "program" performs the processing. However, the program is executed by the CPU 12 or the CPU 22 to perform predetermined processing using the memory device 13 or 23 and a network adapter (communication control device); accordingly, the description may be replaced by description having a subject of the CPU 12 or the CPU 22. The processing disclosed by description having a subject of program may be taken as the processing performed by a computer such as the monitoring apparatus 10. The program, for a part or the entirety thereof, may be implemented by dedicated hardware.

The programs may be installed in computers through a program distribution server or a computer-readable storage medium. In these cases, the program distribution server includes a CPU and storage resources holding a distribution program and the programs to be distributed. The CPU may execute the distribution program to distribute the programs to be distributed to other computers.

This invention is not limited to the foregoing embodiments but includes various modifications. For example, the foregoing embodiments have been provided to explain this invention to be easily understood; it is not limited to the configurations including all the described elements.

A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The configurations, functions, processing units, and processing methods, for a part or all of them, may be implemented by hardware by, for example, designing an integrated circuit. The configurations and functions may be implemented by software, meaning that a processor interprets and executes programs to implement the functions.

The information of programs for implementing the functions, tables, and files can be stored in a storage device such as a memory, a hard disk drive, or an SSD (Solid State Drive), or a storage medium such as an IC card, an SD card, or a DVD.

The drawings shows control lines and information lines as considered necessary for explanation and do not show all control lines and information lines in the products. It can be considered that almost of all components are actually interconnected.

This invention is applicable to a monitoring system for monitoring a system including a plurality of computers.

What is claimed is:

1. A monitoring system comprising:
   a network interface for connecting with computers;
   an input interface for receiving a start time and an end time of a designated period;
   positional information for indicating positions to display failures which occur in the computers on a screen image; and
   event information for indicating failures which occur in the computers, times at which the failures have occurred, and statuses of troubleshooting of the failures,
   wherein the monitoring system is configured to create a screen image indicating failures which occurred by the end time and have not been removed at a current time based on the positional information and the event information,
   wherein the monitoring system is configured to output image data for the created screen image
   wherein the monitoring system is configured to calculate urgency levels for troubleshooting of the failures which occurred from the start time until the end time and have not been removed at the current time based on the event information indicating the failures,
   wherein the monitoring system is configured to create a screen image indicating the failures in appearances differing depending on the calculated urgency levels,
   wherein, in a case where a same failure occurred a plurality of times in a past, the monitoring system is configured to calculate an average time of times required to remove the failure and days elapsed from the latest date the failure was removed until the current time based on the event information,
   wherein the monitoring system is configured to calculate a value by subtracting the calculated average time from a time from occurrence of the failure which has not been removed until the current time as an excess time based on the event information indicating failures which occurred from the start time and the end time and have not been removed at the current time, and
   wherein the monitoring system is configured to calculate each of the urgency levels based on the calculated excess time and the calculated elapsed days.

2. The monitoring system according to claim 1,
   wherein the designated period includes a plurality of indication times,
   wherein the monitoring system is configured to create a plurality of screen images as of the plurality of indication times by creating the plurality of screen images each indicating failures which occurred by one of the plurality of indication times and have not been removed at the current time based on the positional information and the event information, and
   wherein the monitoring system is configured to output image data for successively displaying the plurality of created screen images in chronological order of the plurality of indication times.

3. The monitoring system according to claim 2, further comprising pause time information for indicating times of keeping displaying a single screen image as of a time of occurrence of a failure,
   wherein the monitoring system is configured to determine the times of keeping displaying a single screen image for the plurality of screen images based on the failures in the plurality of screen images and the pause time information, and
   wherein the monitoring system is configured to output image data for successively displaying the plurality of created screen images in chronological order of the plurality of indication times in accordance with the determined times.

4. The monitoring system according to claim 1,
   wherein the designated period includes a plurality of indication times, and
   wherein the monitoring system is configured to calculate the urgency levels as of each of the plurality of indication times based on the event information indicating failures which occurred from the start time until the one of the plurality of indication times and have not been removed at the current time,
   wherein the monitoring system is configured to create a plurality of screen images each indicating the failures in appearances differing depending on the calculated urgency levels based on the urgency levels calculated for each of the plurality of indication times, and
   wherein the monitoring system is configured to output image data for successively displaying the plurality of created screen images in chronological order of the plurality of indication times.

5. The monitoring system according to claim 1,
   wherein the input interface receives a first start time and a first end time of a first designated period and subsequently receives a second start time and a second end time of a second designated period,
   wherein the monitoring system is configured to calculate first urgency levels based on the event information indicating failures which occurred from the first start time to the first end time and have not been removed at the current time,
   wherein the monitoring system is configured to calculate second urgency levels based on the event information indicating failures which occurred from the second start time to the second end time and have not been removed at the current time, and
   wherein the monitoring apparatus creates a screen image indicating differences between the calculated first urgency levels and the calculated second urgency levels.

6. The monitoring system according to claim 1,
   wherein the monitoring system is configured to create the screen image indicating the failures by showing figures having sizes corresponding to the urgency levels in association with the failures appearing in the screen image, and
   wherein, in a case where a calculated urgency level is higher, the monitoring system is configured to create a screen image highlighting the calculated urgency level by showing the size of the figure larger.

7. A monitoring system comprising:
   a network interface for connecting with computers;
   an input interface for receiving a start time and an end time of a designated period;

positional information for indicating positions to display failures which occur in the computers on a screen image; and event information for indicating failures which occur in the computers, times at which the failures have occurred, and statuses of troubleshooting of the failures, wherein the monitoring system is configured to create a screen image indicating failures which occurred by the end time and have not been removed at a current time based on the positional information and the event information, and wherein the monitoring system is configured to output image data for the created screen image, wherein the monitoring system is configured to calculate urgency levels for troubleshooting of the failures which occurred from the start time until the end time and have not been removed at the current time based on the event information indicating the failures, wherein the monitoring system is configured to create a screen image indicating the failures in appearances differing depending on the calculated urgency levels wherein the monitoring system is configured to create the screen image indicating the failures by showing figures having sizes corresponding to the urgency levels in association with the failures appearing in the screen image, wherein, in a case where a calculated urgency level is higher, the monitoring system is configured to create a screen image highlighting the calculated urgency level by showing the size of the figure larger, wherein the figures are circles, wherein the monitoring system holds a highest value and a lowest value for the urgency levels, wherein the monitoring system is configured to receive a largest value and a smallest value for diameters of the circles with the input interface, wherein the monitoring system is configured to define association relations between the diameters of the circles and the urgency levels based on the received largest value and smallest value for the diameters of the circles and the highest value and lowest value for the urgency levels, wherein the monitoring system is configured to determine the diameters of the circles based on the association relations and the calculated urgency levels, and wherein the monitoring system is configured to create a screen image highlighting the calculated urgency levels by creating the screen image showing circles having the determined diameters.

8. The monitoring system according to claim 7, wherein the designated period includes a plurality of indication times, wherein the monitoring system is configured to create a plurality of screen images as of the plurality of indication times by creating the plurality of screen images each indicating failures which occurred by one of the plurality of indication times and have not been removed at the current time based on the positional information and the event information, and wherein the monitoring system is configured to output image data for successively displaying the plurality of created screen images in chronological order of the plurality of indication times.

9. The monitoring system according to claim 8, further comprising pause time information for indicating times of keeping displaying a single screen image as of a time of occurrence of a failure, wherein the monitoring system is configured to determine the times of keeping displaying a single screen image for the plurality of screen images based on the failures in the plurality of screen images and the pause time information, and wherein the monitoring system is configured to output image data for successively displaying the plurality of created screen images in chronological order of the plurality of indication times in accordance with the determined times.

10. The monitoring system according to claim 7, wherein the designated period includes a plurality of indication times, and wherein the monitoring system is configured to calculate the urgency levels as of each of the plurality of indication times based on the event information indicating failures which occurred from the start time until the one of the plurality of indication times and have not been removed at the current time, wherein the monitoring system is configured to create a plurality of screen images each indicating the failures in appearances differing depending on the calculated urgency levels based on the urgency levels calculated for each of the plurality of indication times, and wherein the monitoring system is configured to output image data for successively displaying the plurality of created screen images in chronological order of the plurality of indication times.

11. The monitoring system according to claim 7, wherein the input interface receives a first start time and a first end time of a first designated period and subsequently receives a second start time and a second end time of a second designated period, wherein the monitoring system is configured to calculate first urgency levels based on the event information indicating failures which occurred from the first start time to the first end time and have not been removed at the current time, wherein the monitoring system is configured to calculate second urgency levels based on the event information indicating failures which occurred from the second start time to the second end time and have not been removed at the current time, and wherein the monitoring apparatus creates a screen image indicating differences between the calculated first urgency levels and the calculated second urgency levels.

12. A monitoring method performed by a monitoring system, the monitoring system having:
a processor;
a network interface for connecting with computers;
an input interface for receiving a start time and an end time of a designated period;
positional information for indicating positions to display failures which occur in the computers on a screen image; and
event information for indicating failures which occur in the computers, times at which the failures have occurred, and statuses of troubleshooting of the failures, the monitoring method comprising:

a step of creating, by the processor, a screen image indicating failures which occurred by the end time and have not been removed at a current time based on the positional information and the event information;

a step of outputting, by the processor, image data for the created screen image;

a step of calculating, by the processor, urgency levels for troubleshooting of the failures which occurred from the start time until the end time and have not been removed at the current time based on the event information indicating the failures;

a step of creating, by the processor, a screen image indicating the failures in appearances differing depending on the calculated urgency levels;

a step of calculating, by the processor, an average time of times required to remove a same failure and days elapsed from the latest date the failure was removed until the current time based on the event information in a case where the failure occurred a plurality of times in a past;

a step of calculating, by the processor, a value by subtracting the calculated average time from a time from occurrence of the failure which has not been removed until the current time as an excess time based on the event information indicating failures which occurred from the start time and the end time and have not been removed at the current time; and a step of calculating, by the processor, each of the urgency levels based on the calculated excess time and the calculated elapsed days.

13. The monitoring method according to claim 12, wherein the designated period includes a plurality of indication times, wherein the monitoring method comprises:

a step of creating, by the processor, a plurality of screen images as of the plurality of indication times by creating the plurality of screen images each indicating failures which occurred by one of the plurality of indication times and have not been removed at the current time based on the positional information and the event information; and a step of outputting, by the processor, image data for successively displaying the plurality of created screen images in chronological order of the plurality of indication times.

14. The monitoring method according to claim 13, wherein the monitoring system further includes pause time information for indicating times of keeping displaying a single screen image as of a time of occurrence of a failure, wherein the monitoring method comprises:

a step of determining, by the processor, the times of keeping displaying a single screen image for the plurality of screen images based on the failures in the plurality of screen images and the pause time information; and a step of outputting, by the processor, image data for successively displaying the plurality of created screen images in chronological order of the plurality of indication times in accordance with the determined times.

15. The monitoring method according to claim 12, wherein the designated period includes a plurality of indication times, and wherein the monitoring method comprises:

a step of calculating, by the processor, the urgency levels as of each of the plurality of indication times based on the event information indicating failures which occurred from the start time until the one of the plurality of indication times and have not been removed at the current time;

a step of creating, by the processor, a plurality of screen images each indicating the failures in appearances differing depending on the calculated urgency levels based on the urgency levels calculated for each of the plurality of indication times; and a step of outputting, by the processor, image data for successively displaying the plurality of created screen images in chronological order of the plurality of indication times.

* * * * *